(12) United States Patent
Drzal et al.

(10) Patent No.: US 7,094,451 B2
(45) Date of Patent: Aug. 22, 2006

(54) CHEMICAL FUNCTIONALIZATION OF MATERIAL SURFACES USING OPTICAL ENERGY AND CHEMICALS

(75) Inventors: Lawrence T. Drzal, Okemos, MI (US); Praveen Tummala, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 52 days.

(21) Appl. No.: 10/289,986

(22) Filed: Nov. 7, 2002

(65) Prior Publication Data
US 2003/0194506 A1    Oct. 16, 2003

Related U.S. Application Data

(63) Continuation-in-part of application No. 09/287,978, filed on Apr. 7, 1999, now Pat. No. 6,565,927.

(51) Int. Cl.
*B05D 3/06* (2006.01)
*C23C 18/14* (2006.01)

(52) U.S. Cl. .............. 427/581; 427/515; 427/553; 427/558; 427/595; 250/492.1; 250/504 R; 250/505.1

(58) Field of Classification Search ........ 427/492, 427/508, 510, 512, 515, 553, 558, 581, 595, 427/256, 282, 322, 327, 421, 430.1; 250/492.1, 250/504 R, 505.1
See application file for complete search history.

(56) References Cited

U.S. PATENT DOCUMENTS

| | | | |
|---|---|---|---|
| 3,890,176 A | 6/1975 | Bolon | |
| 4,717,516 A | 1/1988 | Isaka et al. | |
| 4,756,765 A | 7/1988 | Woodroffe | |
| 4,803,021 A | 2/1989 | Werth et al. | |
| 4,810,434 A | 3/1989 | Caines | |
| 4,867,796 A | 9/1989 | Asmus et al. | |
| 4,874,672 A * | 10/1989 | Etter et al. | 428/457 |
| 4,987,032 A * | 1/1991 | Miyasaka et al. | 428/411.1 |
| 5,019,210 A | 5/1991 | Chou et al. | |
| 5,098,618 A | 3/1992 | Zelez | |
| 5,200,122 A * | 4/1993 | Katoh et al. | 264/446 |
| 5,281,798 A | 1/1994 | Hamm et al. | |
| 5,357,005 A | 10/1994 | Buchwalter et al. | |
| 5,387,462 A * | 2/1995 | Debe | 428/323 |

(Continued)

FOREIGN PATENT DOCUMENTS

GB     723631     2/1955

(Continued)

OTHER PUBLICATIONS

Bolon et al., Ultraviolet Depolymerization of Photoresist Polymers, Polymer Eng. and Sci. vol. 12 pp. 109-111 (1972).

(Continued)

*Primary Examiner*—Timothy Meeks
*Assistant Examiner*—Wesley D. Markham
(74) *Attorney, Agent, or Firm*—Ian C. McLeod

(57) ABSTRACT

A method using irradiation with optical light in the presence of a chemical dissolved in a solvent which chemical reacts with the surface in the presence of the irradiation to modify the surface (12A, 104A, 202A, 304A, 402A, 502A) of a substrate (12, 104, 202, 304, 402, 502) is described. The light can be pulsed or continuous. The method is significantly enhanced by the presence of water (14, 124, 204, 308, 410, 508) as the solvent containing the dissolved chemical on the surface. The treated surfaces are more paintable and bondable.

15 Claims, 20 Drawing Sheets

U.S. PATENT DOCUMENTS

| | | | |
|---|---|---|---|
| 5,464,480 A * | 11/1995 | Matthews | 134/1.3 |
| 5,500,459 A | 3/1996 | Hagemeyer et al. | |
| 5,512,123 A * | 4/1996 | Cates et al. | 156/272.6 |
| 5,755,913 A * | 5/1998 | Liaw et al. | 156/272.6 |
| 5,863,333 A * | 1/1999 | Kato et al. | 118/315 |
| 5,871,823 A * | 2/1999 | Anders et al. | 427/512 |
| 5,891,530 A * | 4/1999 | Wright | 427/515 |
| 5,948,484 A * | 9/1999 | Gudimenko et al. | 427/489 |
| 6,022,596 A * | 2/2000 | Baum et al. | 427/555 |
| 6,117,497 A * | 9/2000 | Murahara et al. | 427/581 |
| 6,197,101 B1 * | 3/2001 | Matsumura et al. | 106/287.11 |
| 6,245,155 B1 * | 6/2001 | Leon et al. | 134/3 |
| 6,565,927 B1 * | 5/2003 | Drzal et al. | 427/487 |
| 2003/0194715 A1 * | 10/2003 | Li et al. | 435/6 |

FOREIGN PATENT DOCUMENTS

| | | | |
|---|---|---|---|
| WO | WO 95/20006 A1 * | 7/1995 | |

OTHER PUBLICATIONS

M.J. Walzak et al., UV and Ozone Treatment . . . Polymer Surface Mod.: Relevance to Adhesion, K.L. Mittal (Editor), pp. 253-272 (1995).

M. Strobel et al., A Comparison of gas-phase methods of modifying . . . , Journal of Adhesion Sci. and Tech. pp. 365-383 (1995).

N. Dontula et al., A Study of Polymer Surface Mod . . . Proceedings of 20th Annual Adhesion Society Mtg., Hilton Head, SC (1997).

N. Dontula et al., Surface activation of polymers using . . . , Proceedings of Society of Plastics Eng. ANTEC '97, Toronto, Canada.

Haack, L.P., et al., 22nd Adhesion Soc. Meeting (Feb. 22-24, (1998).

Experimental Methods in Photochemistry, Chapter 7, pp. 686-705 (1982).

* cited by examiner

A: control
B: UV @ t = 2.25 min, d = 2 cms
C: UV @ t = 2.25 min, d = 1 cm
D: UV @ t = 2.25 min, d = 1 cm
and ozone from generator A: control
B: UV @ t = 4 min, d = 2 cms
C: UV @ t = 4 min, d = 2 cms and water droplets on the surface
D: UV @ t = 5 min, d = 2 cms and water droplets on the surface

CHEMICAL FUNCTIONALIZATION OF MATERIAL SURFACES USING OPTICAL ENERGY AND CHEMICALS

CROSS-REFERENCES TO RELATED APPLICATIONS

This application is a continuation-in-part of U.S. application Ser. No. 09/287,978, filed Apr. 7, 1999 now U.S. Pat. No. 6,565,927.

STATEMENT REGARDING FEDERALLY SPONSORED RESEARCH OR DEVELOPMENT

Not Applicable.

Reference to a "Computer Listing Appendix Submitted on a Compact Disc"

Not Applicable.

BACKGROUND OF THE INVENTION (1) Field of the Invention

The present invention relates to a process for treating surfaces of substrates coated with a chemical in a solvent using optical energy to produce surfaces with the chemical bonded to it. In particular, the present invention relates to a preferred process for pretreating surfaces of substrates by providing water containing the chemical between the optical energy source and the substrate.

(2) Description of the Related Art

Manufactured surfaces of substrates always contain undesirable compounds or additives that limit or reduce adhesion to an adhesive or paint film. Hence, surface preparation, which includes cleaning and activation of the surfaces, of polymeric, polymer composite or metal substrates is carried out prior to applying protective paint films or adhesive bonding. Surface preparation determines the mechanical and durability characteristics of the composite created. Currently the techniques used for surface preparation are mechanical surface treatments (e.g. abrasion), solvent wash and chemical modification techniques like corona, plasma, flame treatment and acid etching. Each of the existing processes have shortcomings and thus, they are of limited use. Abrasion techniques are found to be time consuming, labor intensive and have the potential to damage the adherent surface. Use of organic solvents results in volatile organic chemical (VOC) emissions. Chemical techniques are costly and are of limited use with regard to treating three dimensional parts, can be a batch process (such as plasma, acid etching) and need tight control.

The use of lasers for surface treatment is known in the art. The focussed beams of the lasers make it difficult to treat a large surface. U.S. Pat. No. 4,803,021 to Werth et al. describes such a method. U.S. Pat. No. 4,756,765 to Woodroffe describes paint removal with surface treatment using a laser.

Plasma treatment of surfaces is known in the art. Relatively expensive equipment is necessary for such treatments and plasmas are difficult to control. The surfaces are treated with vaporized water in the plasma. Illustrative of this art are U.S. Pat. No. 4,717,516 to Isaka et al., U.S. Pat. No. 5,019,210 to Chou et al., and U.S. Pat. No. 5,357,005 to Buchwalter et al.

A light based process which cleans a substrate surface also creates a beneficial chemistry on the surface for adhesive bonding and paintability is described in U.S. Pat. No. 5,512,123 to Cates et al. The process involves exposing the desired substrate surface to be treated to flashlamp radiation having a wavelength of 160 to 5000 nanometers. Ozone is used with the light to increase the wettability of the surface of the substrate being treated. Surfaces of substrates such as metals, polymers, polymer composites are cleaned by exposure to the flashlamp radiation. The problem with the Cates et al. process is that the surface of the substrate is heated to a relatively high temperature, particularly by radiation above 500 nanometers and relatively long treatment times. Related patents to Cates et al. are U.S. Pat. No. 3,890,176 to Bolon, U.S. Pat. No. 4,810,434 to Caines; U.S. Pat. No. 4,867,796 to Asmus et al.; U.S. Pat. No. 5,281,798 to Hamm et al. and U.S. Pat. No. 5,500,459 to Hagemeyer et al. and U.K. Patent No. 723,631 to British Cellophane. Non-patent references are: Bolon et al., "Ultraviolet Depolymerization of Photoresist Polymers", Polymer Engineering and Science, Vol. 12 pages 109–111 (1972). M. J. Walzak et al., "UV and Ozone Treatment of Polypropylene and poly(ethylene terephthalate)", In: Polymer Surface Modification: Relevance to Adhesion, K. L. Mittal (Editor), 253–272 (1995); M. Strobel et al., "A Comparison of gas-phase methods of modifying polymer surfaces", Journal of Adhesion Science and Technology, 365–383 (1995); N. Dontula et al., "A study of polymer surface modification using ultraviolet radiation", Proceedings of 20$^{th}$ Annual Adhesion Society Meeting, Hilton Head, S.C. (1997); C. L. Weitzsacker et al., "Utilizing X-ray photoelectron spectroscopy to investigate modified polymer surfaces", Proceedings of 20$^{th}$ Annual Adhesion Society Meeting, Hilton Head, S.C. (1997); N. Dontula et al., "Ultraviolet light as an adhesive bonding surface pretreatment for polymers and polymer composites", Proceedings of ACCE'97, Detroit, Mich.; C. L. Weitzsacker et al., "Surface pretreatment of plastics and polymer composites using ultraviolet light", Proceedings of ACT'97, Detroit, Mich.; N. Dontula et al., "Surface activation of polymers using ultraviolet activation", Proceedings of Society of Plastics Engineers ANTEC'97, Toronto, Canada. Haack, L. P., et al., 22nd Adhesion Soc. Meeting (Feb. 22–24, 1999).

Non-pulsed UV lamps have been used by the prior art. These are described in: "Experimental Methods in Photochemistry", Chapter 7, pages 686–705 (1982). U.S. Pat. No. 5,098,618 to Zelez is illustrative of the use of these types of lamps.

A disadvantage of the ultraviolet lamp treatments of the prior art is that they are time consuming and sometimes unreliable. To achieve suitable surface chemistries for adhesive bonding and painting purposes, exposure times for certain materials like polypropylene, thermoplastic olefins (TPO's) tend to be of the order of 5 to 60 minutes. In many cases there is a limit on the length of time to which one may expose the substrates to UV since there is a fear of degrading the substrate. There is a need for development of an environmentally friendly as well as cost effective and robust surface treatment process which can be used over a range of surfaces.

OBJECTS

It is therefore an object of the present invention to provide a process which bonds a chemical to the surface of a substrate.

It is further an object of the present invention to provide a process which is economical.

These and other objects will become increasingly apparent by reference to the following description and the drawings.

SUMMARY OF THE INVENTION

The present invention provides a method using irradiation with optical light in the presence of a chemical dissolved in a solvent which chemical reacts with the surface in the presence of the irradiation to modify the surface of a substrate. The light can be pulsed or continuous. The method is significantly enhanced by the presence of water as the solvent containing the dissolved chemical on the surface. The treated surfaces are more paintable and bondable.

Therefore, the present invention provides a method for modifying a surface, the improvement which comprises (a) providing a solvent on the surface to be modified comprising at least one chemical dissolved in the solvent which reacts with the surface in the presence of optical energy; and (b) irradiating the surface with the optical energy at an intensity sufficient to modify the surface by reacting the chemical with the surface.

The present invention further provides a method for modifying a surface, the improvement which comprises (a) irradiating the surface with an optical energy at an intensity sufficient to render the surface reactive with at least one chemical; and (b) providing on the irradiated surface a solvent comprising the chemical dissolved in the solvent which reacts with the irradiated surface to modify the surface.

In a further embodiment of the above method, the surface is irradiated with the optical energy which is generated by a xenon flashlamp energized by current pulses.

In a further embodiment of the above method, the surface is exposed to ozone dissolved in the solvent during the irradiation.

In a further embodiment of the above method, the irradiating the surface is in a predetermined pattern with the optical energy.

In a further embodiment of the above method, wherein the surface is comprised of a polymer.

In a further embodiment of the above method, the surface comprises a composite material.

In a further embodiment of the above method, the surface comprises a metallic material.

In a further embodiment of the above method, the solvent is water.

In a further embodiment of the above method, the water is provided on the surface by spraying or by humidity in air adjacent to the surface or as a thin sheet of water on the surface.

In a further embodiment of the above method, the surface is treated with ozone prior to irradiating the surface.

In a further embodiment of the above method, the optical energy is at a wavelength between about 185 nanometers and 254 nanometers, without higher wavelengths.

In a further embodiment of the above method, the surface is a polymer with hydroxyl groups and wherein the chemical reacts with the hydroxyl groups to form a covalent bond with the polymer.

In a further embodiment of the above method, the surface is a polymer with hydroxyl groups and the chemical is silane which reacts with the hydroxyl group to form a silyl group on the polymer.

In a further embodiment of the above method, the chemical is a silane of the formula XSi where X is a functional group which is co-linked on the polymer after the reaction with the polymer.

In a further embodiment of the above method, the chemical is an amino silane which forms an amino silyl group on the surface.

In further embodiments, it is desirable to cool the surface with the solvent to freeze the chemically active groups on the outside of the substrate. This is a very unexpected finding, since the prior art is concerned only with heating the surface. The cooling can be by a cooling gas flushed over the surface and/or by using short durations (3 minutes or less) of the ultraviolet light with liquid cooling.

The process of the present invention is cost effective for pretreatment of surfaces of polymers, polymer composites, and metals prior to adhesive bonding or painting. The process creates beneficial surface chemistries for adhesive bonding or painting. The advantages of this process over the existing prior art include that the process is cheaper than chemical modification techniques such as plasma and that it is not a batch process as with plasma and acid etching. Further, the process can be used to treat three dimensional parts where corona and flame treatments have difficulty in treating. The process can also be used to treat large surface areas quicker than flame treatment. In addition, the substrates are not as sensitive to degradation as when exposed to flame, such as with flame treatment. The process is environmentally friendly as compared to solvent wash, acid etching and mechanical abrasion techniques. The process is much cheaper than processes using UV excimer lasers which are cost intensive and work on the principle of ablating the surface layers or roughening the surface or amorphizing the top surface layers. In comparison to the existing ultraviolet lamp techniques, the process reduces the process times for treating various substrate surfaces (thus making it cheaper, and avoiding degradation of the substrates) and achieves surface modifications which were not possible. The invention can be used to tailor the chemistry of the substrate surface by using other cooling reactivating vapors (ozone, ammonium and nitrogen) in between the substrate surface and ultraviolet light.

The process of the present invention uses one step for cleaning the surface and functionalizing the surface so that the materials can be painted without the use of adhesion primers or the use of costly and environmentally unfriendly treatment steps. Further, this process can be used prior to adhesive bonding of polymers, polymer composites and metals, to achieve good bond strengths.

The process of the present invention can be used for treating carbon fibers and carbon whiskers prior to their use in composites, for instance. An alternate use of the process is in the packaging industry where polymers are printed with ink. The process is an easier, flexible or alternate way for the packaging industry to create materials with different barrier properties for solvents.

The substance and advantages of the present invention will become increasingly apparent by reference to the following drawings and the description.

BRIEF DESCRIPTION OF DRAWINGS

FIGS. 18A to 18D are ESEM images of PATTI tested failure surfaces of baseline MTPO (without UV stabilizers).

FIGS. 19A to 19F are ESEM images of PATTI tested failure surfaces of UV treated MTPO (without UV stabilizers) UV treatment conditions were t=4 min at d=2 cms.

FIGS. 20A to 20D are ESEM images of PATTI tested failure surfaces of baseline RTPO (without UV stabilizers).

FIGS. 21A to 21D are ESEM images of PATTI tested failure surfaces of ozone treated RTPO (without UV stabilizers). Ozone treatment conditions were t=30 min at d=2 cms.

FIGS. 22A to 22D are ESEM images of PATTI tested failure surfaces of UV treated RTPO (without UV stabilizers). The UV treatment was done in presence of water for t=4 min at d=2 cms.

FIGS. 18 and 19 are graphs showing contact angle measurements for the epoxy paint.

DESCRIPTION OF THE PREFERRED EMBODIMENTS

All patents, patent applications, government publications, government regulations, and literature references cited in this specification are hereby incorporated herein by reference in their entirety. In case of conflict, the present description, including definitions, will control.

Preferably, the surface of the substrate is exposed to an optical energy source provided by an ultraviolet (UV) lamp or flashlamp emitting the radiation in the required wavelength range (180 nm–500 nm). The substrate surface to be treated is preferably constructed of a polymer, polymer composite, or a metal. Prior to exposing the substrate to UV radiation, water droplets or a sheet of water are preferably placed on the substrate surface or provided by humidity in the air adjacent to the substrate surface.

In a further embodiment of the present invention, a method is provided for covalently bonding one or more chemicals to the surface of a substrate surface. A solvent comprising at least one chemical dissolved therein is placed on the substrate surface in the form of droplets, a sheet, or humidity which is then irradiated with optical energy of sufficient intensity and duration that the chemical becomes covalently bonded to groups on the substrate surface thereby modifying the surface of the substrate. Preferably, the solvent is water. Alternatively, the surface of the substrate is irradiated with the optical energy to render the surface reactive with at least one chemical and then the solvent comprising the chemical dissolved therein is placed on the irradiated surface in the form of droplets, a sheet, or humidity wherein the chemical in the solvent reacts with the irradiated surface to become bound thereon.

Process times are regulated by the distance of the UV lamp or flashlamp from the substrate surface, ambient temperature or condition and the extent of surface modification needed. The distance of the UV lamp or flashlamp from the substrate surface determines the intensity of UV radiation at the surface substrate and the time required to evaporate the water if present on the surface or bond the chemical when present in the water to the surface. Ambient conditions are important depending on whether air, nitrogen, or ozone are present. Surface modifications are characterized using contact angle measurements which are done using a Rame-Hart goniometer apparatus with deionized water. The present process creates surfaces which wet better than if they were exposed solely to UV radiation (180 nm–500 nm), creates similar substrate surfaces in a shorter time than that achieved using only UV or ozone and is cheaper than using only UV or ozone.

In an alternate embodiment, a film of water is placed on a quartz or fused silica tray above the substrate to filter out longer wavelengths in infrared region (over ≈1200 nm). In this embodiment, only UV is allowed to interact with the substrate surface.

Figure 1:
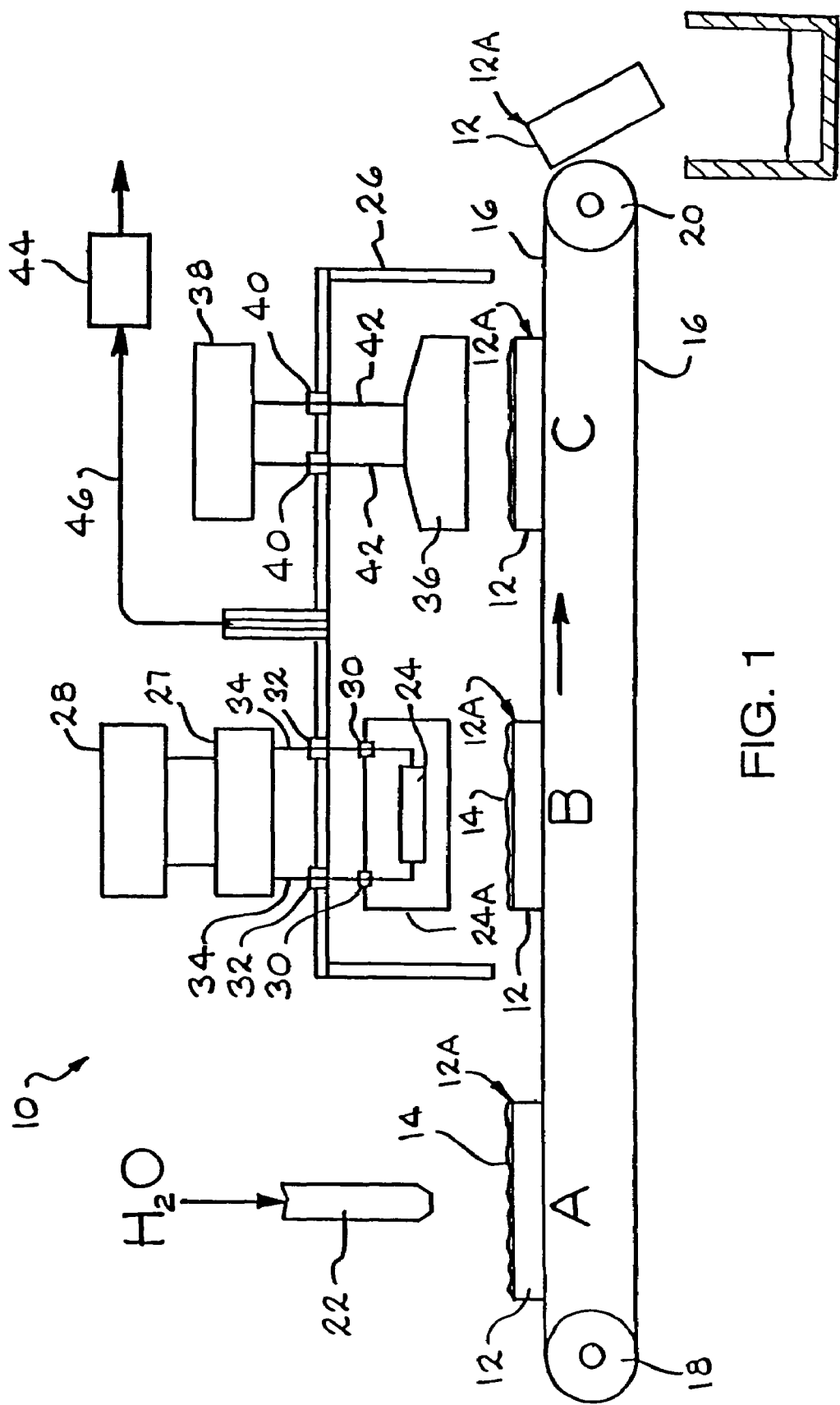
FIG. 1 is a schematic side view of a conveyor system 10 for applying a spray of water droplets 14 onto a surface 12A of a substrate 12, then irradiating the substrate 12 with the water droplets 14 on it using a UV lamp 24 and then drying the substrate 12 to remove traces of the water droplets 14 with an electric heater 36 without melting the surface.
Figure 3:
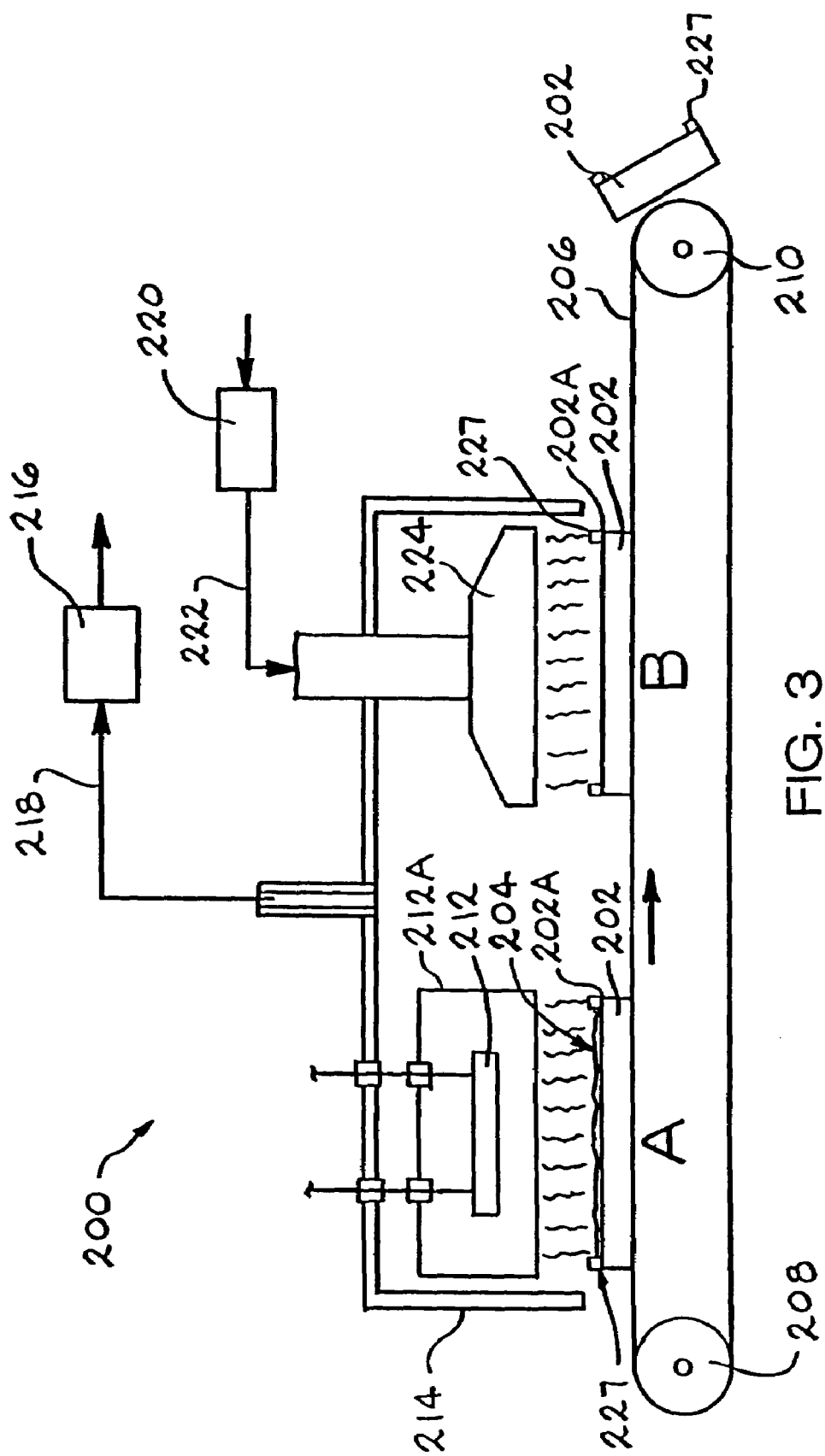
FIG. 3 is a schematic side view of a conveyor system 200 of a third embodiment with a substrate 202 with a layer of water 204 held in place by a dam 227 on surface 202A while the surface 202A is irradiated by a UV lamp 212, then the substrate surface 202A is air dried by air from a diffuser 224.
Figure 4:
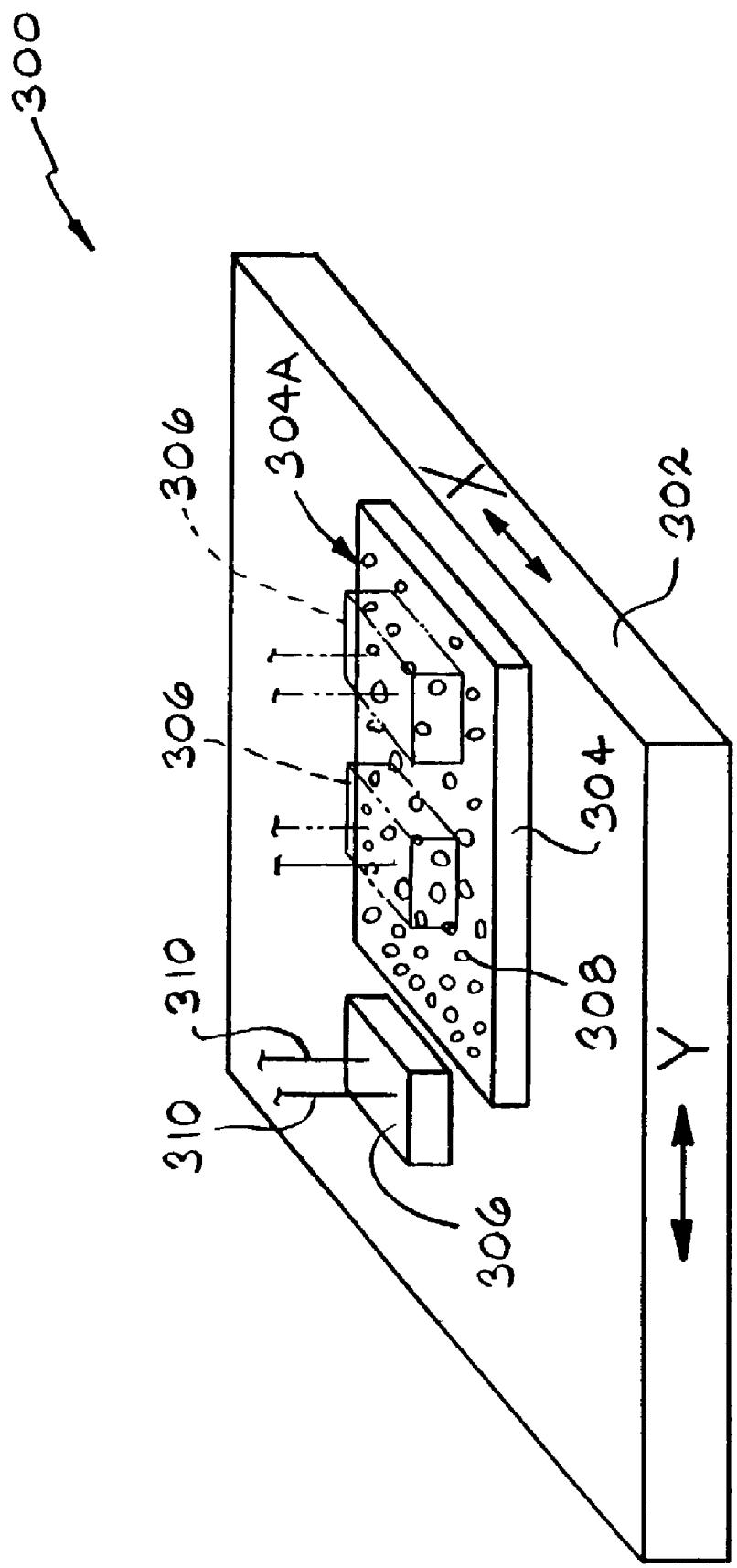
FIG. 4 is a perspective view of an x-y movable table 302 of a fourth embodiment supporting a substrate 304 with water droplets 308 on surface 304A so that the position of the substrate 304 is varied under the housing 306 containing lamp (not shown) as a function of time. The position of the housing 306 containing the lamp (not shown) can also be varied.

The process can also be used in a continuous process by either having a falling film of water on the substrate or by immersing the substrate in water and then exposing the substrate to UV radiation (FIG. 3). The lamp could be moving over a row of substrates or the substrate surface could be moving under a bank of lamps (FIG. 4). The lamps could be arranged to irradiate all surfaces, such as a tunnel of lamps. Alternatively, the current process can also be used in a continuous process by dispersing water in the form of fine droplets using an atomizer or any other technique between the lamp and the substrate surface (FIG. 1). In any of the embodiments, either the lamp or the substrate surface can be moving. In addition, to use this process as a continuous process, air or ozone, or other gases can be bubbled through water at various flow rates which may be introduced onto the substrate. In a further embodiment of the above processes for modifying the surface of a substrate, the water comprises one or more chemicals dissolved therein which reacts with the surface of the substrate when exposed to the UV radiation of sufficient intensity and duration to bond the chemical to a group on the surface of the substrate. Alternatively, the one or more chemicals are in a solvent other than the water.

FIG. 1 shows a preferred system 10 of the present invention for irradiating a substrate 12 which has a coating of water droplets 14. The substrate 12 is provided on a conveyor belt 16 supported for rotation on belt tensioning rollers 18 and 20. Conveyor belt 16 moves from left to right as indicated by the arrow. At a first station A, a spray nozzle 22 disperses droplets 14 of the water onto the surface 12A of the substrate 12. The substrate 12 is then moved to station B where the surface 12A is irradiated with UV light from a lamp 24 in a housing 24A mounted in a hood 26 which is opaque to the light to prevent eye damage. The lamp 24 is controlled by a pulse modulator 27 and operated by a power supply 28. Insulators 30 and 32 are provided for wires 34 leading from the hood 26. Upon irradiating the surface 12A, the substrate 12 is moved to station C where the surface 12A is dried by an electric heater 36 operated by a power supply 38. Insulators 40 pass wires 42 through the hood 26. The substrate 12 is then removed taking care to keep surface 12A clean. The surface 12A is then painted or otherwise treated in a conventional manner (not shown). The hood 26 is provided with a blower 44 which removes volatilized products from the hood 26 through line 46.

In operation, the system 10 moves the substrate 12 through stations A, B and C for treatment. The substrate 12 is provided with water 14 at station A, irradiated at station B, dried at station C and then removed from the system 10 for subsequent treatment.

Figure 2:
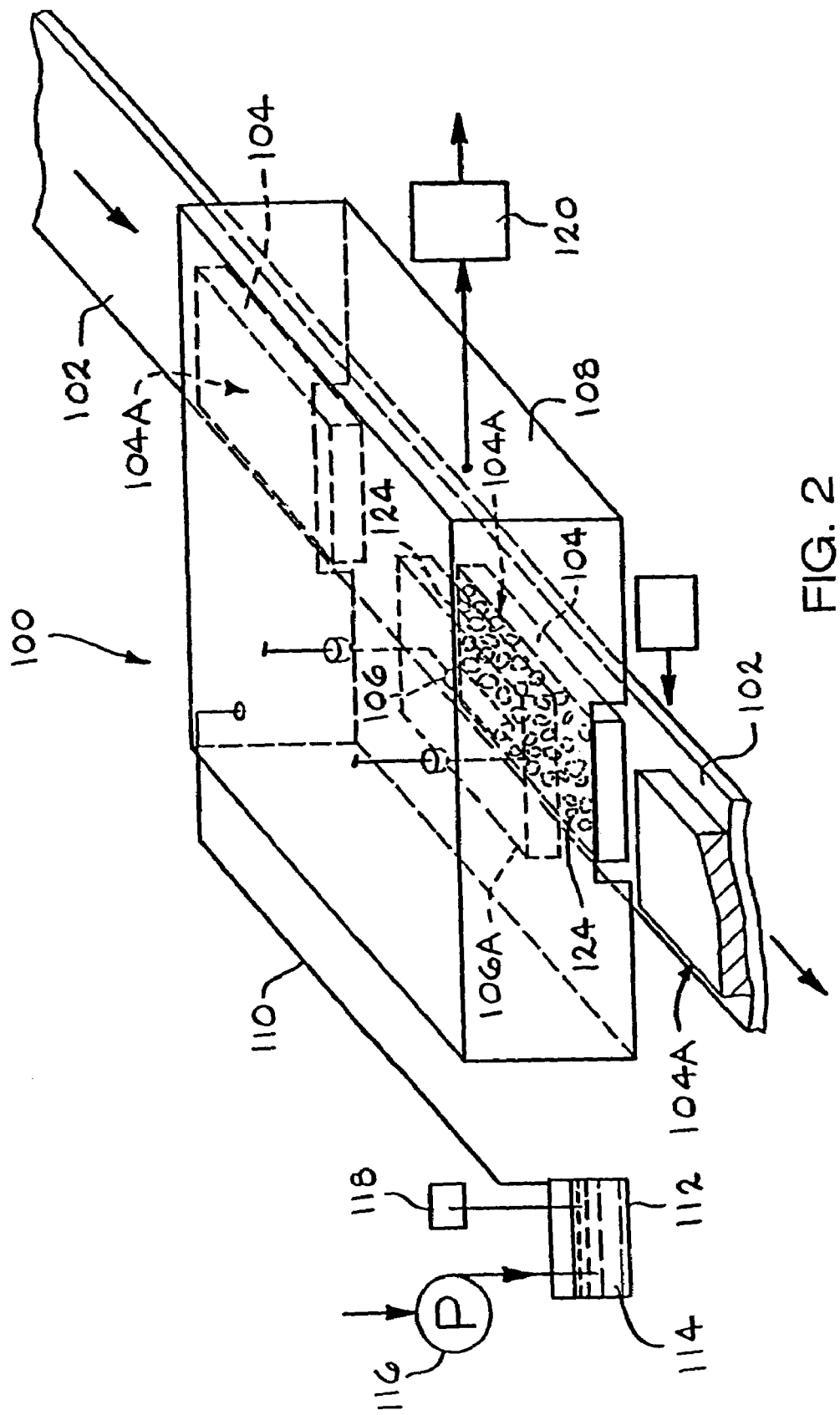
FIG. 2 is a schematic perspective view of a conveyor system 100 of a second embodiment for a substrate 104 wherein moist air is introduced into a chamber 108 containing the substrate 104 to place droplets 124 on the surface 104A and then irradiated with a UV lamp 106. The surface 104A is then air-dried upon removal from the chamber 108.

FIG. 2 shows a system 100 wherein a conveyor belt 102 provides a substrate 104 to be irradiated by lamp 106 in housing 106A. The conveyor moves from right to left as indicated by the arrow. The lamp 106 is powered by power supply (not shown) and pulse modulator (not shown) similar to power supply 28 and pulse modulator 27 as shown in FIG. 1. The substrate 104 is surrounded by a chamber 108 which confines the substrate 104 and moist air is introduced via line 110 into the chamber 108. The line 110 is supported from a vessel 112 containing water 114. Air is bubbled into the water 114 by pump 116. If designated, the water 114 or air is also ozonated by generator 118. The chamber 108 is vented by blower 120 which draws the moisture laden air through the chamber 108. Upon removal of the substrate 104 from the chamber 108, the surface 104A is air-dried by air directed at the surface 104A by a blower (not shown).

In operation, the system 100 provides air on the surface 104A of the substrate 104. The substrate 104 can be cooled to encourage moisture to condense as droplets 124 on the surface 104A. The substrate 104 is irradiated by the UV lamp 106 and then air-dried upon removal from the chamber 108. The substrate surface 104A is then painted or otherwise treated, taking care to prevent contamination.

FIG. 3 is a schematic view of a variation of the system 10 of FIG. 1 wherein the system 200 is provided with a substrate 202 having a layer of water 204 on a surface 202A which is spread on the surface 202A. As before, the substrate 202 is supported on a conveyor belt 206 on tensioning rollers 208 and 210. The belt 206 moves from left to right as indicated by the arrow. The substrate surface 202A is irradiated by lamp 212 in housing 212A through the layer of water 204 at station A. As before, the lamp 212 is provided in a hood 214 with a blower 216 connected by line 218 to the hood 214. At station B an air blower 220 supplies dry air into the hood 214 via line 222 and diffuser 224 held in place by a dam 227 to dry the surface 202A of the substrate 202. The substrate 202 with dam 227 is then removed from the conveyor belt 206. In station B, the drain 227 can be removed for drying by the air from blower 220.

FIG. 4 shows a system 300 for moving a table 302 in the x-y direction. The substrate 304 under a housing 306 containing a lamp (not shown). The table 302 indexes the substrate 304 under the housing 306. Droplets 308 of water are provided on the surface 304A of the substrate 304. Alternatively, the housing 306 can be moved as shown by the dotted lines. The lamp in the housing 306 is supplied by a power supply and pulse modulator (not shown) via wires 310, as shown in FIG. 1.

Figure 5:
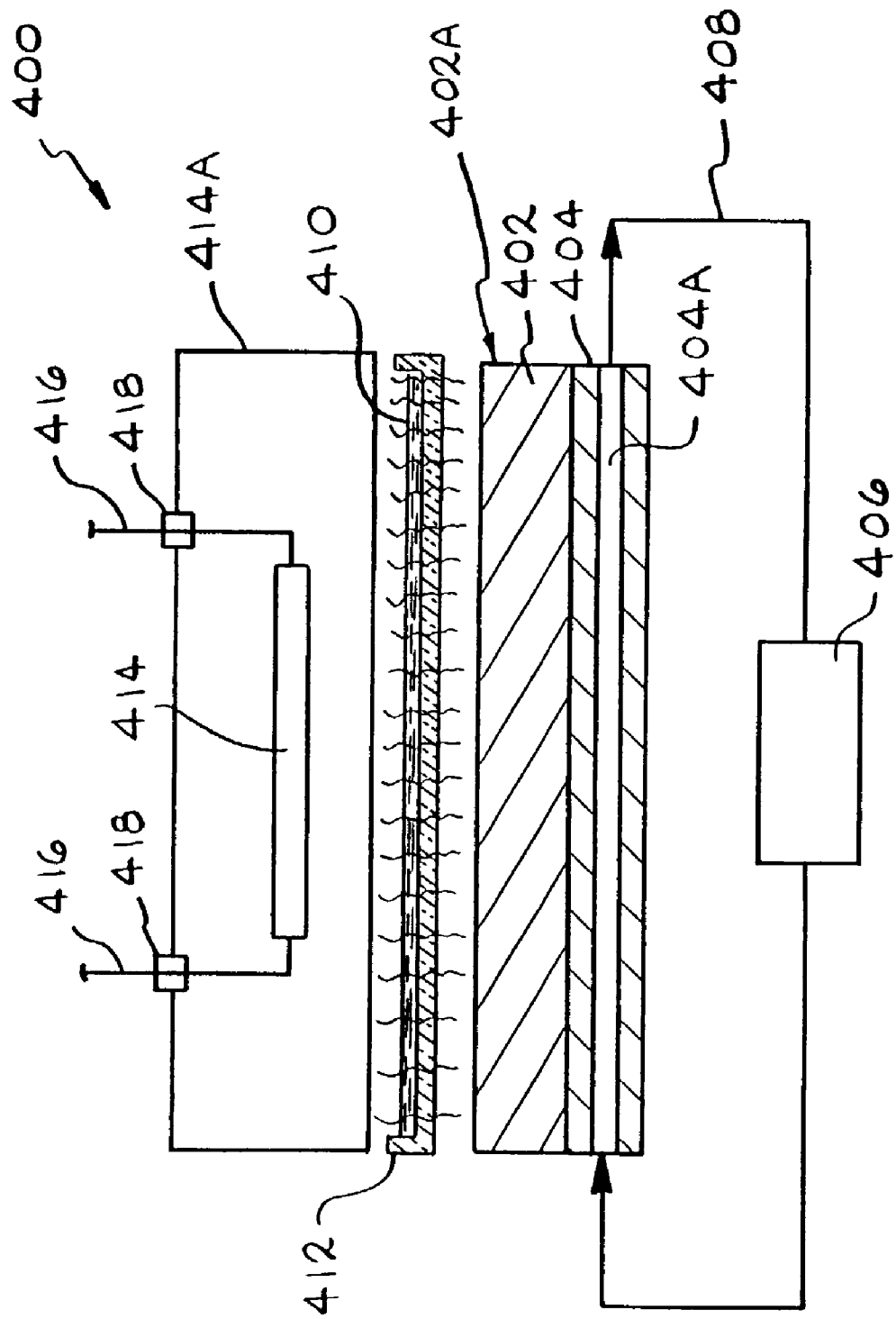
FIG. 5 is a schematic side view of a conveyor system 400 of a fifth embodiment with substrate 402 with a layer of water 410 on surface 402A and with a transparent layer 412 to filter out infrared light. A cooling plate 404 is provided for the substrate 402.

FIG. 5 shows a system 400 wherein the substrate 402 is mounted on a cooling plate 404 provided with a channel 404A supplied with a coolant by a pump or compressor 406 and line 408. A layer of water 410 held in place by a transparent layer or tray, such as quartz. The surface 402A of the substrate 402 is irradiated through the layer 412 and water 410 by lamp 414 in housing 414A. As before, the lamp 414 is powered by a power supply and modulated by a modulator (not shown) by lines 416 through insulators 418. In this embodiment, the transparent layer 412 holds the water 410 in place. The filtering of the infrared light by the water 410/layer 412 (quartz) assures that the substrate 402 does not overheat. This system 400 can be incorporated into any one of the other systems 10, 100, 200, or 300.

Figure 6:
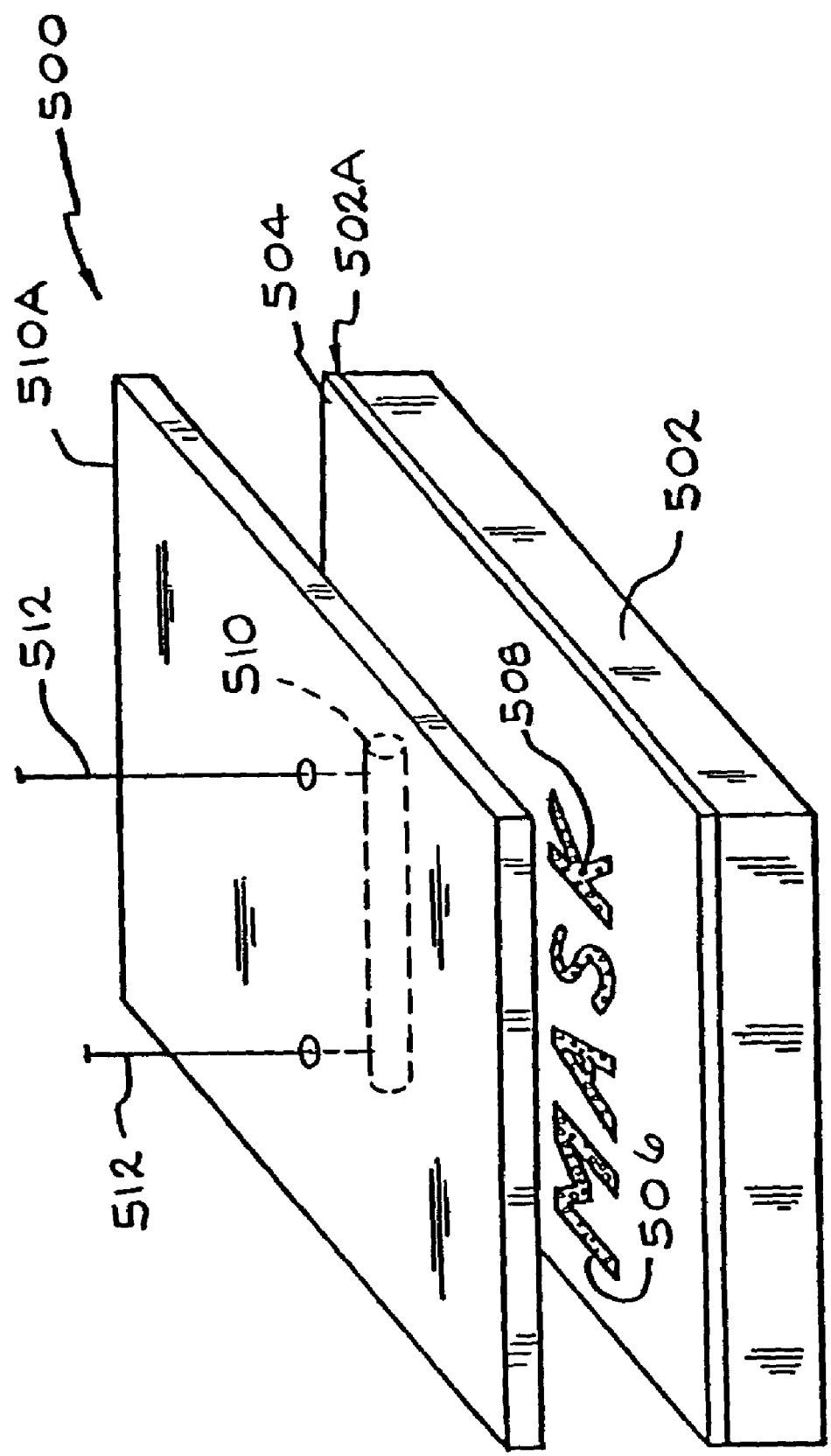
FIG. 6 is a schematic perspective view of a system 500 of a sixth embodiment wherein a substrate 502 with an opaque mask 504 having cutouts 506 forming the word "MASK" to the substrate 502 which are filled with water 508. The cutouts 506 are irradiated with a UV lamp 510.

FIG. 6 shows a system 500 wherein the substrate 502 is protected by an opaque mask 504. The mask 504 has cutouts 506 spelling the word MASK which goes to the surface 502A of the substrate 502. The cutouts 506 are provided with water 508. The mask 504 is irradiated with a lamp 510 in a housing 510A powered by a power supply and pulse modulator (not shown) as in FIG. 1 via lines 512. In this embodiment, the surface 502A is treated to make the cutouts 506 receptive to further treatment.

In the following Examples 1 to 12, a pulsed xenon lamp from Xenon Corporation, located in Woburn, Mass. is capable of providing the emission at wavelengths below 225 nm is used in the experiments. The materials used in the experiments were: (1) polypropylene based thermoplastic olefins (TPO), both reactor grade and mechanically blended with different amounts of UV stabilizers and sheet molding compound (SMC), both standardized and flexibilized, (2) aluminum alloy sheets (Al 5754, Al 5052 and Al 6061), (3) polycarbonate, and (4) vinyl ester. Polycarbonate was selected as a model base amorphous polymer. The experiments show that the nature of the substrate is an important factor in determining the extent of modification by UV radiation.

To study ozone's effect on the extent of surface modification, an ozone generator was included in the experimental setup. The other variables that play a role in the extent of modification of the substrate surfaces by UV are: distance of lamp from the substrate surface (d), exposure time (t), effect of humidity surrounding the substrate, intensity of lamp radiation, presence of UV stabilizers in the substrate, the nature of the substrate surface and cooling of the surface.

Normally, the environment between the lamp and the surface of the material being treated is normal ambient air. During some experiments, an external ozone generator (Ozotech, Eureka, Calif. 96097) was used to increase the concentration of ozone over the sample surface over what is generated in air by the UV light. The ozone flow rate used during experimentation was 30 std.cu.ft./hr. The other variables were the time of exposure, the distance between the sample and the UV source and the glass plate used to isolate the lamp tube from the sample. A pulsed lamp is preferred to prevent overheating of the substrate. Two types of glass plates were used: SUPRASIL™ fused silica (Heraeus) and PYREX® glass (Corning). The glass plates act as filters and have different transmission characteristics. SUPRASIL™ fused silica transmits light in the UVC region and has a 10% transmission at 170 nm. PYREX® glass transmits light primarily in the UVB region (280 nm and higher) and filters the high frequency UVC radiation. PYREX® glass has 10% transmission at a frequency of 280 nm.

Moisture can be added in a variety of ways. The incoming air can be saturated with moisture to near 100% relative humidity by bubbling the air or nitrogen or another gas through water to saturate it. Alternatively, water can be sprayed onto the surface using a common atomizer prior to introducing the surface to the UV radiation under the lamp. The spraying process creates very small droplets, less than 1 micron in diameter on the surface. In addition, the sample can be covered with a very thin, continuous layer of water.

Figure 8:
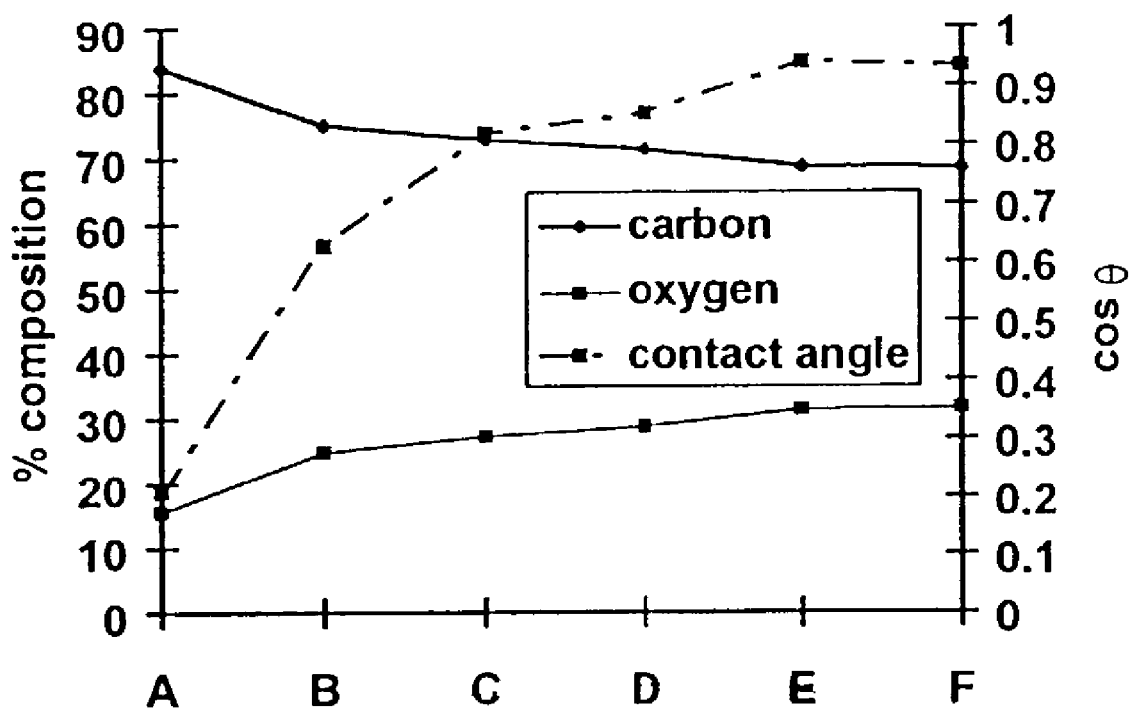
FIG. 8 are graphs showing x-ray photoelectron spectroscopy (XPS; percent composition) and contact angle (cos θ) measurements with water for polycarbonate. A: control; B: UV @ t=2.25 min, d=2 cms; C: UV @ t=2.25 min, d=1 cm; D: UV @ t=2.25 min, d=2 cms, ozone from generator; E: UV @ t=2.25 min, d=1 cm, and water droplets on surface and F: UV @ t=2.25 min, d=1 cm, ozone from generator.
Figure 11A:
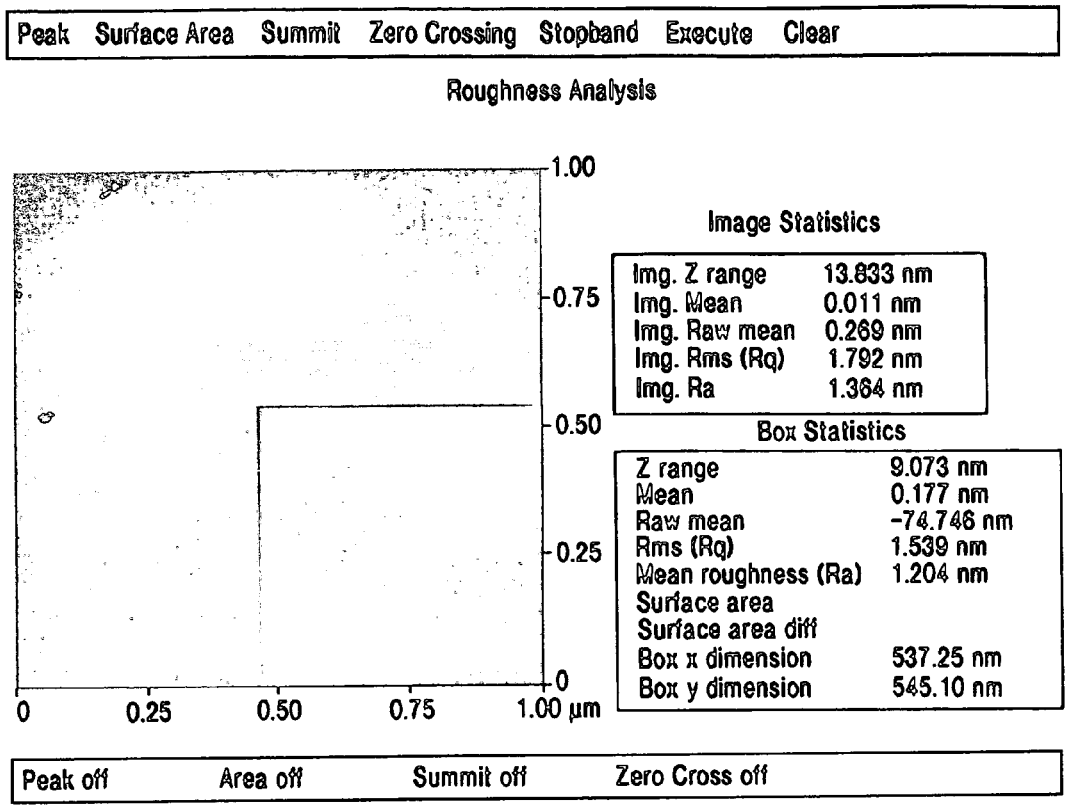
FIG. 11A is an AFM image of a control (baseline) sample of polycarbonate.
Figure 11B:
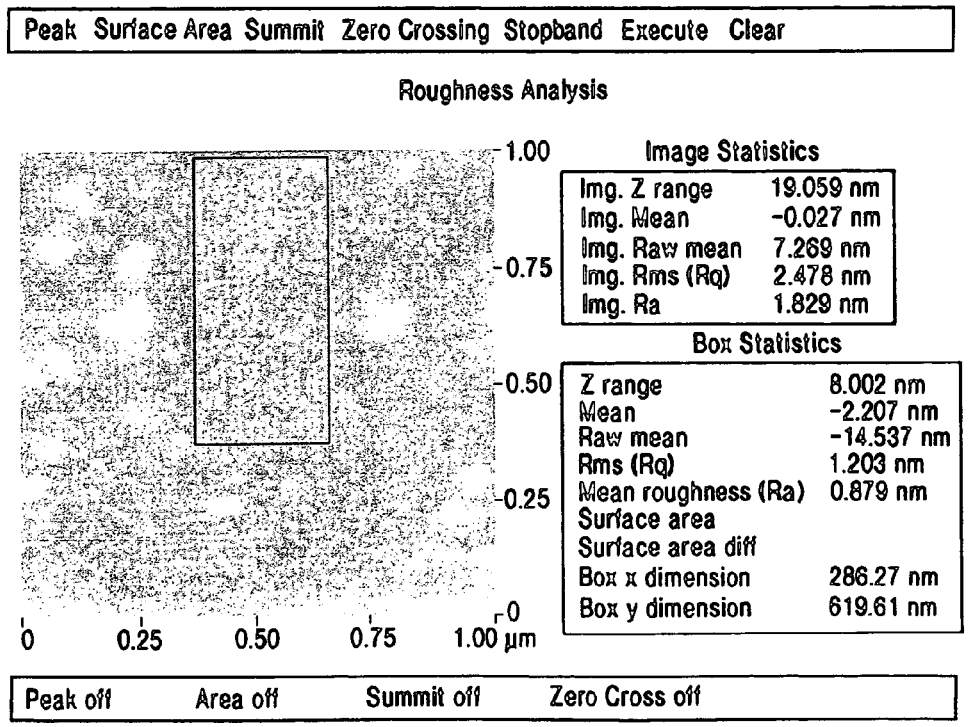
FIG. 11B is an AFM image of UV treated polycarbonate. UV treatment conditions were t=2.25 min, d=1 cm.

The experiments show that the treatment enhances the substrate's surface wettability, with the degree of enhancement depending on the substrate characteristics and the treatment processing conditions used. The substrates are characterized prior to and after UV treatment using contact angle measurements to determine wettability. X-ray photoelectron spectroscopy (XPS) and Fourier transform infrared spectroscopy with the attenuated total reflectance (FTIR-ATR) setup is used to characterize the surface chemical composition of the substrates. XPS results show an increase in the oxygen content of the polycarbonate substrates after UV treatment (FIG. 8). Atomic force microscopy (AFM) is used to characterize and compare the control substrate surfaces with the UV treated surfaces (FIGS. 11A and 11B). Also, environmental scanning electron microscopy (ESEM) is being used to determine the effect initial substrate morphology has on UV treatment (FIGS. 14A to 14D). Stability studies on the UV treated polycarbonate surfaces show that the surfaces are stable in time at room temperature. Adhesion measurements have been conducted using a pneumatic adhesion tensile testing instrument.

On exposure to various treatments the substrates were characterized for wettability, surface chemical composition, morphology and stability. Wettability was determined by measuring contact angles of de-ionized water using the Rame-Hart goniometer apparatus. Except where specified, the contact angles ($\theta$) were measured immediately after UV exposure. At least ten measurements of contact angles were taken for each sample and the averages are reported here. To correlate the change in wettability to a change in surface chemical composition, Fourier transform infrared spectroscopy (FTIR) with the ATR cell was used. Measurements using zinc selenide crystal at sampling depths of 1–2 microns and germanium crystal at a sampling depth of 0.5 microns were carried out. The FTIR-ATR spectra did not show any significant change in the polymer samples after UV treatment. Thus, it was concluded that the changes caused by UV on the polymers were confined to a few atomic layers near the surface and FTIR-ATR was seeing the polymer to depths of a few microns.

X-ray photoelectron spectroscopy (XPS) was used to characterize the substrate surfaces for a change in chemical composition after UV treatment. A Perkin-Elmer Physical Electronics PHI5400 ESCA Spectrometer equipped with both a standard Mg K$\alpha_{1,2}$ X-ray source, and a monochromated Al K$\alpha_{1,2}$ X-ray source, and an electron flood gun for neutralization was used. The instrument uses a 180° hemispherical energy analyzer operated in the fixed analyzer mode and a position sensitive detector. The instrument has variable apertures available from spot sizes of 250 μm to a rectangle of 1.5×5 mm. The optimum spot size for the conditions used in these experiments is the 1.00 mm diameter aperture. Resolution settings for collecting data are 89.45 eV for survey (wide window) scans, 35.75 eV for utility resolution and 17.90 eV for high resolution scans.

Use of the monochromatic source on a non-conducting sample necessitates the use of a neutralization source. This instrument utilizes a low energy electron flood gun. Prior to establishing the baseline chemistry of untreated polymers, the neutralizer operating conditions had to be optimized. This was accomplished by first aligning the neutralizer with mylar, followed by using these conditions on the baseline TPO and polycarbonate samples. The peak shape of the C1s was used to assess the neutralizer operation. An asymmetric C1s peak was initially observed. To determine if this was real or due to the neutralizer, the specimen was analyzed using the standard Mg source set to 150 W, 15 kV. Lower power was used to minimize damage that may occur when the non-monochromatic source is used. It was concluded that the asymmetry was an artifact of the neutralizer. The operating conditions were adjusted through several iterations until the Cls peak shape was symmetric. A molybdenum mask was employed to assist in neutralizing the charging occurring in the samples, where the mask attracts electron and causes a distribution of electrons to spread across the sample surface. Use of the mask has improved the reproducibility of neutralizing, allowing the same neutralizer setting to be used from sample to sample.

To determine whether surface topography had changed due to UV treatment, atomic force microscopy (AFM) of the polymer samples was done using a Nanoscope III made by Digital Instruments (FIGS. 11A and 11B. Along with AFM, environmental scanning electron microscopy (ESEM) was also used to characterize surface morphology prior to and after UV treatment (FIGS. 14A to 14D and 15A to 15B). Also, ESEM was used to determine if there was any relationship between extent of modification and initial morphology of the substrate. The ESEM used for the morphological study was an Electroscan 2020.

Figure 7:
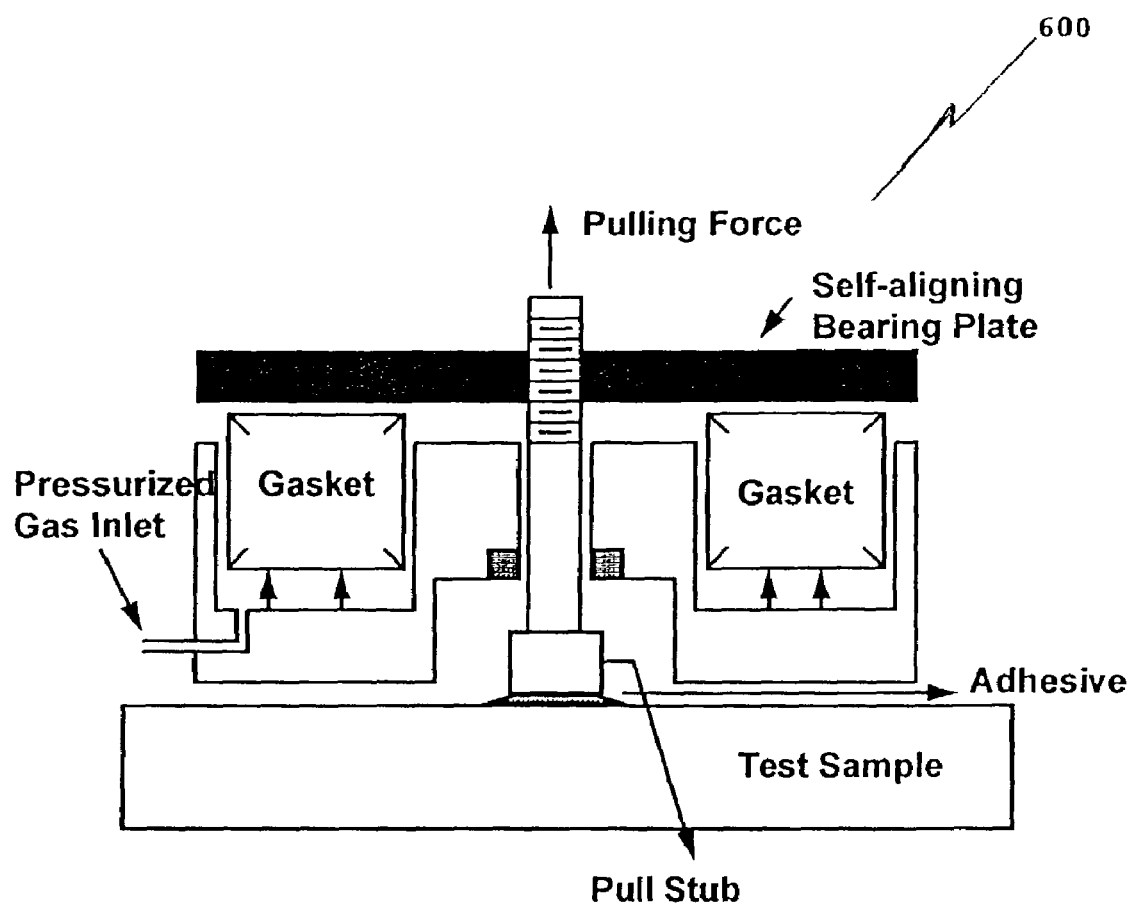
FIG. 7 is a schematic representation of a PATTI tester 600.

A pneumatic adhesion tensile testing instrument (PATTI) was used to measure adhesion properties as a function of UV treatment (FIG. 7). This instrument (PATTI-2A) is made by SEMicro division, M. E. Taylor Engineering, Inc. This instrument uses compressed inert gas to apply a continuous load to a 0.5 inch (outer diameter) aluminum pull stub which is bonded to the test surface with an adhesive. Once the pull stub has been bonded and the adhesive cured, the stub is attached to a piston. The piston design assures uniaxial alignment with the pull stub axis for "true tensile testing". A continuous load is applied perpendicular to the pull stub until failure occurs. The PATTI instrument and method conforms to ASTM D4541, "Pull-off strength of coatings using portable adhesion testers".

For many applications such as painting, corrosion protection, adhesive bonding, and the like, the surfaces of substrates have to be treated to alter their native chemistry to one that is beneficial for the intended application. Because of the need to reduce or eliminate volatile organic compounds from the air and organic liquid and vapor wastes, a simple, inexpensive method was needed for treating the surfaces of the substrates which was environmentally benign. The further embodiment of the present invention wherein a solvent comprising one or more chemicals reactive with the surface of the substrate when the surface is irradiated with an optical energy source as mentioned previously satisfies the above need.

Thus, by treating the surface of the substrate (which includes polymers, metals, ceramics, or composites, as a solid film, fiber, or particle) in the manner disclosed above but wherein one or more chemicals dissolved in a solvent, preferably water, is in contact with the surface of the substrate during or following irradiation with the optical energy source to modify the surface. In either arrangement, the surface of the substrate is modified by reaction of the one or more chemicals with the surface of the substrate to produce a substrate with a modified surface with improved wettability, chemical compatibility, and adhesiveness. This further embodiment of the present invention provides a substantial improvement (up to about 500%) in adhesion through the addition of specific chemical groups to the surface of substrates. This embodiment is particularly remarkable because of its easy implementation, simplicity, ease of use, cleanliness, and minimal use of solvents or chemical compounds.

The advantages of this embodiment for modifying surfaces of substrates include the short treatment times needed to modify the surface with a chemical, the ability of the method to be conducted at ambient temperatures and pressures, that the method does not involve the use of caustic acids or solutions, that it is environmentally acceptable, that it can be used with any shape substrate (for example, film, fiber, particle, or the like), and that it is economically competitive or superior to the methods currently being used. Further advantages include that any functional chemical or compound soluble in water can be applied to the surface; the water allows the UV light to pass through it without attenuation; the surface of the substrate being treated remains low; and the treatment times are short. For example, metalization of plastic surfaces can be conducted without the use of electrolytic cells, strong acidic or caustic solutions, and without solutions containing metal wastes. Likewise, polymers can be grafted onto metallic surfaces to provide corrosion protection to the metallic surfaces. Thus, this embodiment of the present invention would be of interest to the U.S. government and to American, British, Canadian, French, German, and Asian companies. It would be of particular interest to the automobile and structural sectors of the above companies.

In a preferred embodiment, the optical energy source is preferably high intensity ultraviolet light. The substrate surface to be treated is immersed in a thin solution of one or more water soluble chemicals or compounds covering the surface to a depth of preferably about 1 to 5 mm wherein the one or more chemicals has a desirable chemical functionality in water. The surface is then irradiated with the optical energy source, preferably short wavelength UV light from about 180 to 300 nm wavelength. The radiation from the optical energy source interacts with the one or more chemicals in the water to induce a chemical reaction between a group on the one or more chemicals and a group (such as a hydroxyl group or the like) on surface of the substrate in which the one or more chemicals becomes covalently bonded to the surface or the radiation from the optical energy source interacts with the substrate surface to disrupt and change chemical bonds to create a surface with reactive groups favorable to covalently bond a group on the one or more chemicals to the surface, or both. Alternatively, the substrate surface is irradiated with the optical energy source, preferably with short wavelength UV light from about 180 to 300 nm wavelength, and optionally in the presence of ozone, to render the surface reactive to one or more chemicals. After irradiation, the irradiated surface is immersed in a solution comprising the one or more water soluble chemicals to covalently bond the one or more chemicals to the surface of the substrate.

The chemical in the solution can be any chemical with a reactive group including, but not limited to, organic silanes, aldehydes, ketones, hydroxy acids, acid halides, alcohols, thiols, esters, amides, ethers, epoxies, and the like, which will react with the substrate surface. The preferred solvent for the chemical is water; however, for particular chemicals such as epoxies, the preferred solvent is an organic solvent. Thus, as an example, when the surface is a polymer with hydroxyl groups, the reactive group of the chemical in the solvent or water reacts with the hydroxyl groups when the surface is irradiated with the optical energy while the surface is immersed in the solution comprising the chemical or immersed in the solution comprising the chemical following the exposure to the optical energy to covalently bond the chemical to the surface.

In a further example, the surface is a polymer with hydroxyl groups and the chemical in the solvent or water is an organic silane which reacts with the hydroxyl groups when the surface is irradiated with the optical energy source, preferably UV light, while the surface is immersed in the solution comprising the chemical or immersed in the solution comprising the chemical following the exposure to the optical energy source to form a silyl group on the surface. The Si atom of the silyl group can be bound to one hydroxyl group or bridge two or three hydroxyl groups.

In a further example, when the surface is a polymer with hydroxyl groups and the chemical in the solvent or water is an XSi organic silane where X is a functional group which becomes co-linked on the polymer when irradiated with the optical energy source, preferably UV light, while the surface is immersed in the solution comprising the chemical or immersed in the solution comprising the chemical following the exposure to the optical energy source. Thus, the overall effect of the method is the rapid reaction between the chemical and the substrate surface.

Thus, the organic silanes and XSi organic silanes which are useful are those which react with the reactive groups on the surface of the substrate. Included are the preferred silanes of the formula:

$(RO)_3SiR_1$ where R is a lower alkyl group (1 to 8 carbon atoms) and $R_1$ can be an organic group which can be an alkyl, alkoxy, alkenyl or alkynyl, cycloaliphatic, aromatic group containing 1 to 25 carbon atoms. $R_1$ can include substituents of O, N, or S and can provide a hydroxide, an aldehyde, acid, base, sulfide, cyanide, mercaptan, and the like. Examples of basic moieties especially useful as catalysts include amines and pyridyl groups. Useful acidic functionalities include carboxylic acids, sulfonic acids, and furoinated sulfonic acids. $R_1$ can contain a halogen selected from the group consisting of F, I, Br, and Cl and the $R_1$ group can be further reacted at the halogen group. The particularly useful $R_1$ contains moieties which are metal binding to provide selective adsorption of metal ions to the surface, which is particularly useful for polymeric substrates which are to be coated with a metal. Especially useful metal trapping agents include organic groups containing chelating ligands such as ethylene diamines, ethylene diamine tri- and tetra acetate, cyclic and bicyclic polyethers known as crown ethers and cryptans and the like. The mixed metal alkoxides and organic-alkoxy silanes can be obtained commercially. Alternatively, they may be specifically prepared for use in modifying particular surfaces. For instance, desired mixed metal alkoxides may be prepared by reaction of the parent alkoxides in desired molar ratios under reflux for 3–4 hours. Functional organosilanes can be prepared by hydrosilylation of olefins.

Other preferred silanes are of the class $RO_2Si(R_2)_2$ where $R_2$ can be the same as $R_1$. The general formula is $Si(OR)_{4-n}(R)_n$ where n is 1, 2, or 3. Preferably, $R_1$ or $R_2$ contains a functional group selected from a metal, vinyl, cyano, amino, mercapto, halogen (usually Cl or Br), aldehyde, ketone acid (including sulfuric and F-sulfuric acid or base group). The metals help form structures where the metal is removable and provides increased receptivity to the metal removed. Preferably $R_1$ or $R_2$ is a functional group.

Examples of commercially available functional silanes which can be used are:

3-(N-allylamino)propyltrimethoxy-silane;
O-allyloxy(polyethyleneoxy)-trimethylsilane;
N-(2-aminoethyl)-3-aminopropylmethyl-dimethoxysilane;
N-(2-aminoethyl)-3-aminopropyltri-methoxysilane  N-[3-(trimethoxysilyl)propyl]ethylenediamine;
N-(6-aminohexyl)aminopropyl-trimethoxysilane;
2-[Methoxy(polyethyleneoxy)propyl]trimethoxysilane;
(3-Trimethoxysilylpropyl)diethylene-triamine 95%;
Trivinylmethoxysilane;
3-Cyanopropyldimethylmethoxysilane;
3-Cyanopropyltriethoxysilane;
(3-Cyclopentadienylpropyl)triethoxysilane;
Diphenyldiethoxysilane;
Diphenyldimethoxysilane;
Diphenylsilanediol;
Diphenylvinylethoxysilane;
(Mercaptomethyl)dimethylethoxysilane;
(Mercaptomethyl)methyldiethoxysilane;
3-Mercaptopropylmethyldimethoxysilane;
3-Mercaptopropyltrimethoxysilane;
3-Mercaptopropyltriethoxysilane;
3-Methacryloxypropyldimethylethoxy-silane;
3-Methacryloxypropyldimethylmethoxysilane;
3-Methacryloxypropylmethyldiethoxy-silane;
3-Methacryloxypropylmethyldimethoxysilane;
3-Methacryloxypropyltrimethoxysilane;
Methylphenyldimethoxysilane;
Methyl[2-(3-trimethoxysilylpropylamino)-ethylamino]-3-propionate (65% in methanol);
7-Oct-1-enyltrimethoxysilane;
Phenethyltrimethoxysilane;
N-Phenylaminopropyltrimethoxysilane;
Phenyldimethylethoxysilane;
Phenyltriethoxysilane;
Phenyltrimethoxysilane;
Phenylvinyldiethoxysilane;
N-[3-(triethoxysilyl)propyl]-4,5-dihydro-imidazole;
2-(Trimethoxysilyl)ethyl-2-Pyridine;
Trimethoxysilylpropyldiethylenetriamine (95%);
N[(3-trimethoxysilyl)propyl]ethylene-diamine triacetic acid, trisodium salt (50% in water);
N-(3-trimethoxysilylpropyl)pyrrole;
Triphenylsilanol;
Vinyldimethylethoxysilane;
Vinylmethyldiethoxysilane;
Vinyltriethoxysilane;
Vinyltrimethoxysilane;
3-Cyanopropyldimethylmethoxysilane;
3-Cyanopropyltriethoxysilane;
(3-Cyclopentadienylpropyl)triethoxysilane;
Diphenyldimethoxysilane;
Diphenylsilanediol;
Diphenylvinylethoxysilane;
(Mercaptomethyl)dimethylethoxysilane;
(Mercaptomethyl)methyldiethoxysilane;
3-Mercaptopropylmethyldimethoxysilane;
3-Mercaptopropyltrimethoxysilane;
3-Mercaptopropyltriethoxysilane;
3-Methacryloxypropyldimethylethoxy-silane;
3-methacryloxypropyldimethylmethoxysilane;
3-Methacryloxyproopylmethyldiethoxy-silane;
3-Methacryloxypropylmethyldimethoxysilane;
3-Methacryloxypropyltrimethyoxysilane;
Methylphenyldimethoxysilane;
Methyl[2-(3-trimethoxysilylpropylamino)-ethylamine]-3-propionate (65% in methano);
7-Oct-1-3nyltrimethoxysilane;

Phenethyltrimethoxysilane;
N-phenylaminopropyltrimethoxysilane;
Phenyldimethylethoxysilane;
Phenyltriethoxysilane;
Phenyltrimethoxysilane;
Phenylvinyldiethoxysilane;
N-[3-(triethoxysilyl)propyl]-4,5-dihydro-imidazole;
2-(Trimethoxysilyl)ethyl-2-pyridine;
Trimethoxysilylpropyldiethylenetriamine (95%);
N-[(3-trimethoxysilyl)propyl]ethylene-diamine triacetic acid, trisodium salt (50% in water);
N-(3-trimethoxysilylpropyl)pyrrole;
Triphenylsilanol;
Vinyldimethylethoxysilane;
Vinylmethyldiethoxysilane;
Vinyltriethoxysilane;
Vinyltrimethoxysilane;
N-(trimethoxysilylpropyl)ethylene-diamine, triacetic acid, trisodium salt;
4-Aminobutyldimethylmethoxysilane;
4-Aminobutyltriethoxysilane (95%);
N-(2-aminoethyl)-3-aminopropylmethyldi-methoxysilane;
$H_2NCH_2CH_2CH_2SiOEt$ 3-aminopropyldimethylethoxysilane;
3-Aminopropylmethyldiethoxysilane;
3-Aminopropyldiisopropylethoxysilane;
3-Aminopropyltriethoxysilane;
3-Aminopropyltrimethoxysilane;
N-(triethoxysilylpropyl)urea (50% in methanol).
N-[3-(triethoxysilyl)propyl]phthalamic acid (95%).

The above list is not meant to be limiting, but merely intended to provide examples of easily obtainable functional silanes useful in the method of the present invention. In general, any functional organosilane can be grafted onto to the surface of a substrate using the method of the present invention. Functional organo groups on the silane moiety that are especially useful include acids and bases for catalytic applications, dye chromophores for sensing, and complexants for binding metal ions. In the latter case the bound metal ions may be recovered by ion exchange or subsequently used in the immobilized state as catalysts for organic chemical transformation.

The efficacy of this further embodiment of the present invention has been demonstrated in a laboratory setting. A polymeric surface consisting of 20% glass fiber-reinforced PET was immersed in a solution consisting of an amino functional silane in water. After exposing the surface to UV light, an adhesive epoxy was applied to the surface. It was found that the adhesion strength had been increased by about 500%. X-ray photoelectron spectroscopy analysis of the surface after 60 second, 90 second, or 240 second exposures showed that a significant number of nitrogen atoms from the amino functional silane had been bonded to the surface by the treatment and these bound nitrogen atoms were responsible for the dramatic increase in adhesion. Example 15 provides the results of PATTI tests of silylated polymeric surfaces consisting of 20% glass fiber reinforced PET in which the surface of a polymeric substrate had been silyated by either exposing the surface to UV light or UV light and ozone and then immersing the surface in a silane and water solution or exposing the surface to UV light while the surface was immersed in the silane and water solution.

By manipulating the intensity of the UV exposure, the thickness of the solution layer, temperature, exposure duration, chemical composition of the solution, and substrate type, the number of sites on the substrate surface bound to the chemical can be increased or decreased which in turn modifies to different extents the adhesiveness, wettability, and chemical compatibility of the substrate surface. Thus, this further embodiment of the present invention enables the surface of a substrate to be modified to provide a substrate surface with the particular characteristics desired.

EXAMPLE 1

Polymer samples (control and UV treated) were bonded to aluminum stubs using an epoxy structural adhesive, ARALDITE® AW106 adhesive with hardener HV953 (from Ciba Geigy Corporation). 30 micron sized glass bubbles from 3M Corporation (S60/10000, 3M SCOTCHLITE™ Glass Bubbles) were used to control the adhesive bond line thickness. In order to attain its full strength, the adhesive was allowed to cure for more than 15 hours at room temperature. Five or more samples were tested for control and each treatment condition. ESEM was used to characterize the polymer side of the PATTI test in order to determine the locus of failure. The following paragraphs summarize the results of the UV experiments for various polymers.

Table 1 shows the effect of UV treatment with the xenon lamp on samples of polycarbonate where d=distance of lamp from the substrate surface and t=exposure time.

TABLE 1

Contact angle measurements on polycarbonate

| Sample/Treatment Conditions | Water Contact Angle (degrees) |
|---|---|
| Control | 78 |
| UV @ t = 1 min, d = 2 cms | 64 |
| UV @ t = 1 min, d = 1.4 cms | 49 |
| UV @ t = 2.25 min, d = 1 cm | 35 |
| UV @ t = 2.25 min, d = 1 cm, with water droplets on the surface | 20 |
| UV @ t = 2.25 min, d = 1 cm and ozone from ozone generator | 21 |

It was observed that polycarbonate is significantly modified by UV radiation. From Table 1, it is also observed that the same synergistic effect of water is seen for polycarbonate as was noted for reactor grade TPO. Also, decreasing the distance between the lamp surface and the substrate or increasing the ambient ozone concentration was observed to enhance the surface wettability.

FIG. 8 is a plot of the carbon and oxygen content on the polycarbonate surface as a function of various UV treatment conditions. This was obtained using XPS. Also plotted in the same FIG. 8 is the cosine of the contact angle (θ) against the UV treatment conditions. With increase in the intensity of UV treatment (either due to decreasing distance between lamp and substrate or presence of water droplets on the surface or presence of ozone from ozone generator in the ambient) there is an increase in the oxygen content on the surface (increases from 15% to 31%) and also there is a corresponding increase in the wettability of the substrate (cos(θ) approaches a value of 1 which corresponds to θ equal to 0 or the substrate being perfectly wettable). Thus, XPS is able to detect changes in surface chemical composition after UV treatment.

Figure 9:
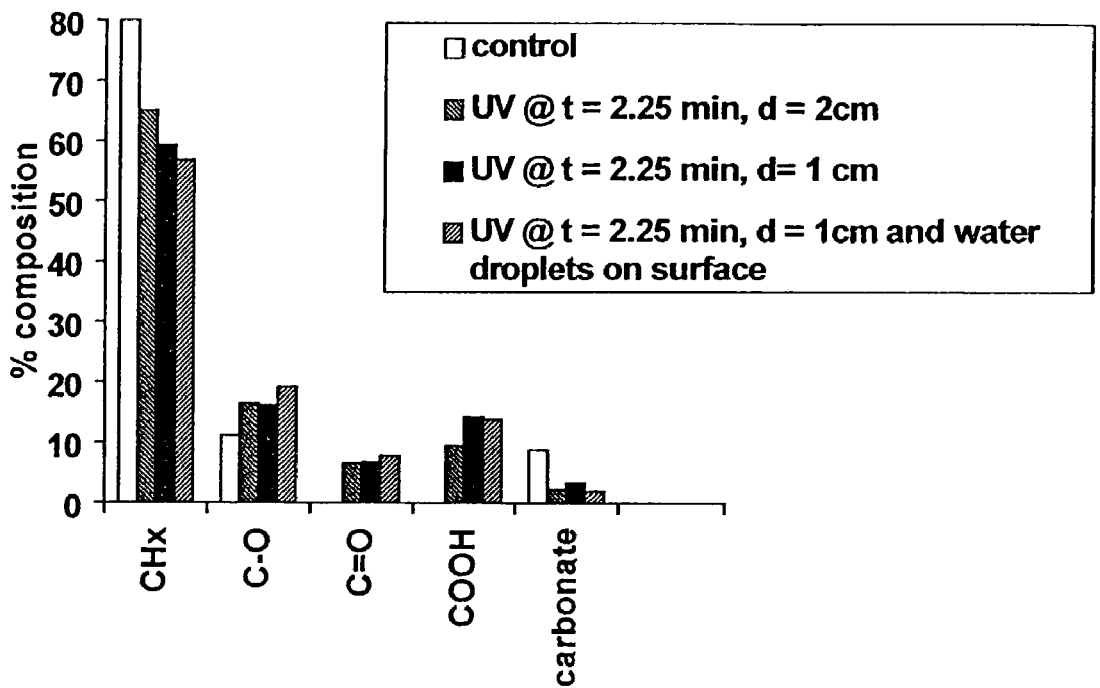
FIG. 9 is a graph showing Cls curve fits on XPS measurements of polycarbonate surfaces treated with UV and water.
Figure 10:
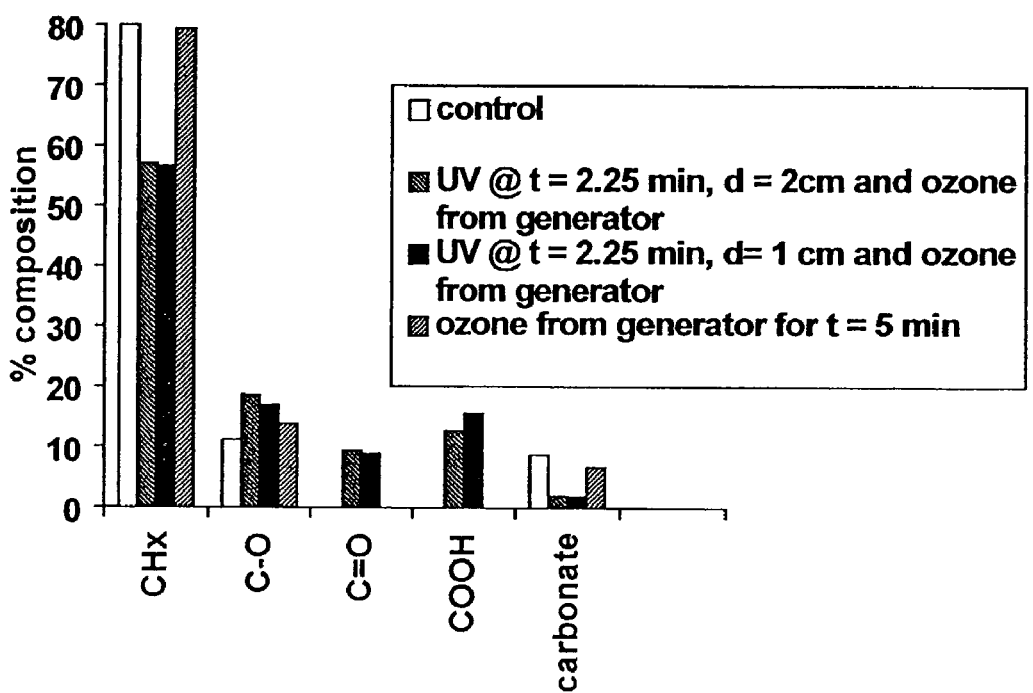
FIG. 10 is a graph showing Cls curve fits on XPS measurements of polycarbonate surfaces treated with UV and ozone.

Chemical information indicating changes in the surface treated polycarbonates was further investigated by curve fitting the C1s spectra. Curve fitting defines and interprets the carbon chemistry as detected at the sample surface by allowing the user to distinguish overlapping features with a carbon 1s spectral envelope. Using a curve fit model, the surface chemical composition for control and various treated polycarbonate samples were compared. FIG. 9 compares the effect of the distance from the UV lamp, and the presence of water during UV exposure on surface chemical composition. Upon surface treatment, oxygen functional groups have been added to the polycarbonate surface. There is a marked increase in the C—O, and oxygen functionality's such as C=O, COOH and COOR. The carbonate peak has decreased and this is consistent through all the UV treated polycarbonate samples. FIG. 10 shows that UV used along with ozone also showed an increase in the oxygen functionality. FIG. 10 also shows that there is no change in the polycarbonate chemistry within experimental error when exposed to ozone only for 5 minutes.

Figure 12A:
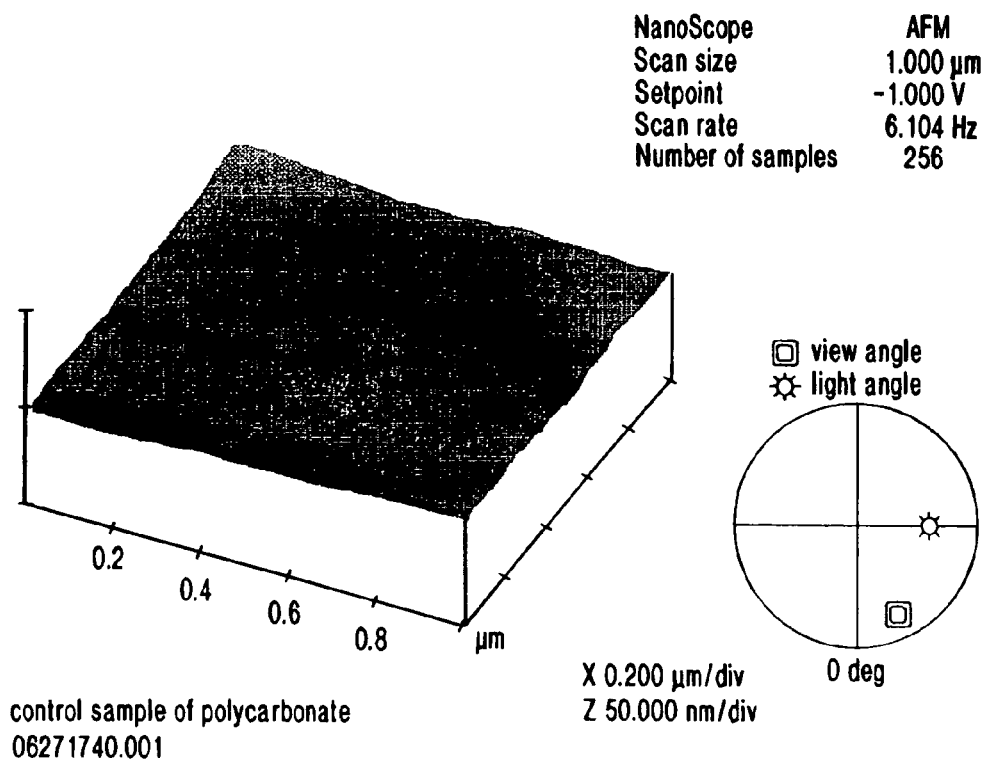
FIG. 12A is a surface plot of the polycarbonate control sample AFM image (FIG. 11A).
Figure 12B:
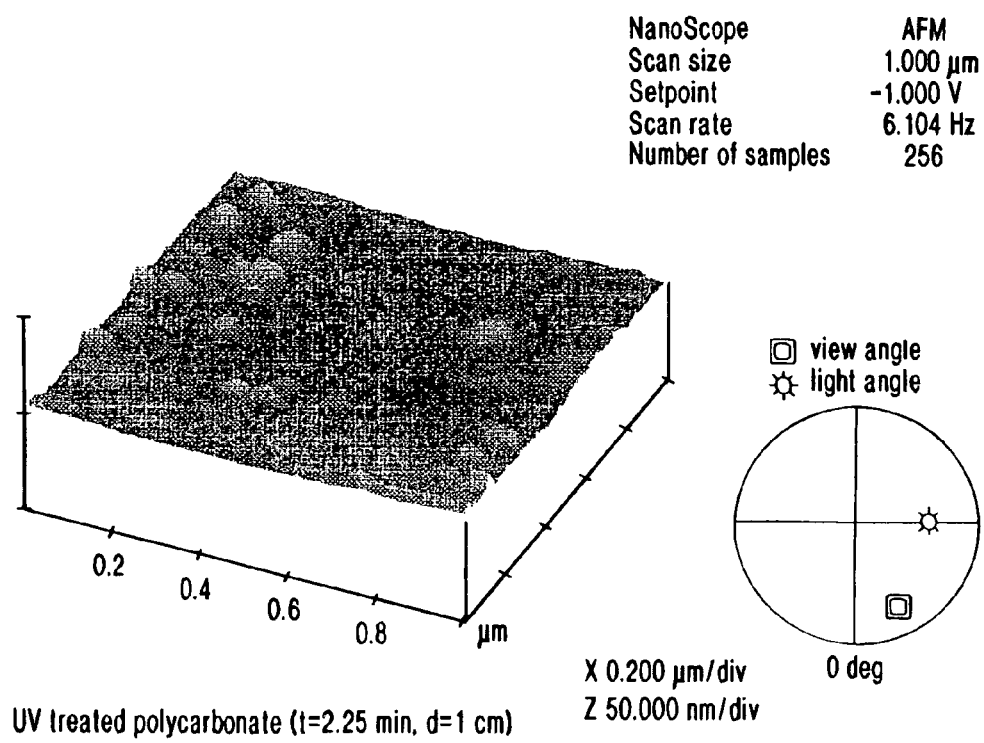
FIG. 12B is a surface plot of the UV treated polycarbonate AFM image (FIG. 11B).

AFM was used to determine if UV treatment altered the substrate topography. The surface topography of polycarbonate was studied as a function of UV treatment. FIGS. 11A and 11B are a comparison of images obtained from AFM for control and UV treated polycarbonate. It was observed that the topography is different. The image for the UV treated polycarbonate shows regions which are lighter in gray scale. This corresponds to peaks on the substrate surface. An analysis of these images in terms of surface plots, show the UV treated polycarbonate surface to have a number of peaks (corresponds to white regions in gray scale) and troughs (corresponds to dark regions in gray scale). This is shown in FIGS. 12A and 12B. The frequency of these peaks and troughs was found to depend on the intensity of the UV treatment. Intensity increased with a decrease in the distance between the lamp and the substrate and also with the presence of water droplets on the substrate surface.

Figure 13:
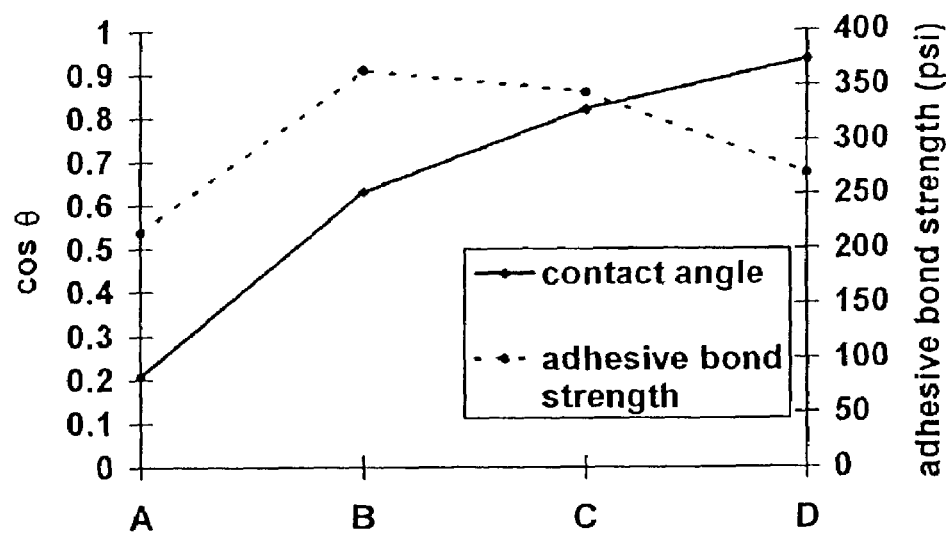
FIG. 13 is a graph showing the effect of UV treatment on adhesive bond strength and contact angle with water (cos θ) for polycarbonate.
Figure 14A:
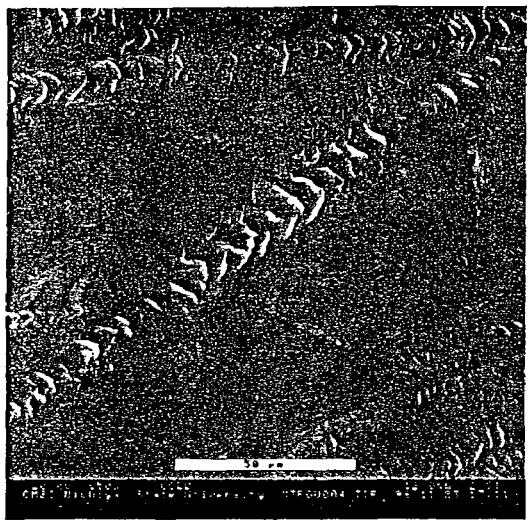
FIGS. 14A to 14D are ESEM images of the molded surfaces of mechanical grade TPO (FIGS. 14A and 14B) and reactor grade TPO (FIGS. 14C and 14D).
Figure 14B:
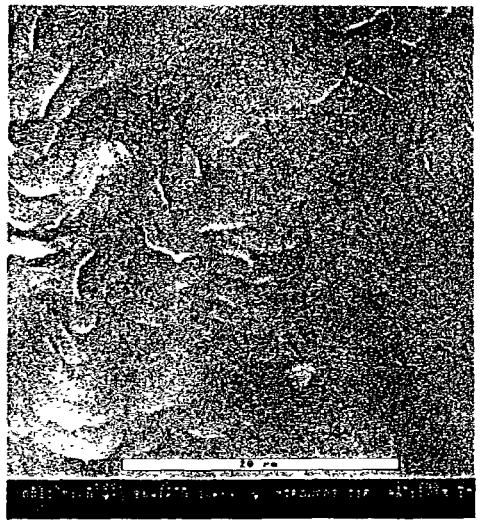
Figure 14C:
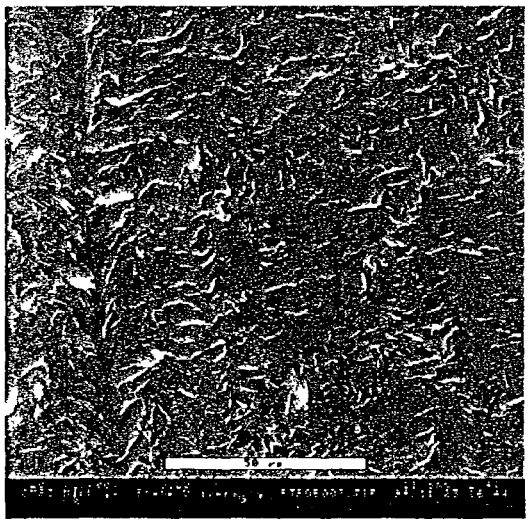
Figure 14D:
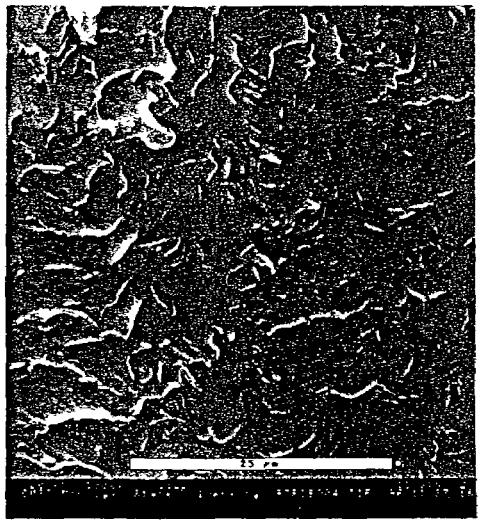

FIG. 13 shows the effect of UV treatment on wettability and bond strength for polycarbonate. UV and ozone treatments increased the wettability, and enhanced adhesive bond strengths. The extent to which the bond strength increases is dependent on the UV treatment condition and the nature of the polymer after UV treatment with bond strength increases of 200% for polycarbonate. Besides affecting bond strength, failure mode was observed to have changed from control samples to different UV treatment conditions. The locus of failure can be evaluated by characterizing the tested samples using XPS or ESEM. A main use of this process is as a surface pretreatment for polymers, composites or metals prior to the painting or adhesive bonding step. Thus, it was necessary to know what changes occurred on the UV treated surfaces as a function of time, temperature and moisture after the UV treatment. In Tables 2, 3 and 4, contact angle measurements for the preliminary time and moisture stability studies conducted on polycarbonate at room temperature are listed.

TABLE 2

Contact angle measurements on UV treated polycarbonate. UV treatment was for t = 2.25 min at d = 2 cms

| Sample Conditions | Water Contact Angle (degrees) |
| --- | --- |
| control (analyzed immediately after UV) | 51 |
| aged for 2 hours at room temperature | 47 |
| aged for 4 hours at room temperature | 49 |
| aged for a day at room temperature | 48 |
| aged for 7 days at room temperature | 48 |
| rinsed in deionized water for 5 min | 54 |

TABLE 3

Contact angle measurements on UV treated polycarbonate. UV treatment was for t = 2.25 min at d = 1 cm.

| Sample Conditions | Water Contact Angle (degrees) |
| --- | --- |
| control (analyzed immediately after UV) | 35 |
| aged for 2 hours at room temperature | 29 |
| aged for 4 hours at room temperature | 27 |
| aged for a day at room temperature | 31 |
| aged for 7 days at room temperature | 33 |
| rinsed in deionized water for 5 min | 54 |

TABLE 4

Contact angle measurements on UV treated polycarbonate. UV treatment was for t = 2.25 min at d = 1 cm with water droplets on the surface.

| Sample Conditions | Water Contact Angle (degrees) |
| --- | --- |
| control (analyzed immediately after UV) | 20 |
| aged for 2 hours at room temperature | 27 |
| aged for 4 hours at room temperature | 26 |
| aged for a day at room temperature | 28 |
| aged for 7 days at room temperature | 30 |
| rinsed in deionized water for 5 min | 55 |

It was observed that the contact angle made by de-ionized water on the substrates does not change significantly over the span of 7 days. This means that the UV treated polycarbonate surfaces are stable at room temperature. On rinsing the UV treated samples for 5 minutes in de-ionized water with slight agitation and then drying on a KIMWIPES® tissue, the measured contact angles were found to be higher than the control sample for that particular UV treatment. These measured contact angles were lower than those obtained for the untreated polycarbonate (78%). From this it may be reasoned that though UV modifies polycarbonate, it might also create low molecular weight species on the surface which are dislodged during rinsing. More experiments need to be done to verify this hypothesis and determine the moisture stability of UV treated surfaces.

EXAMPLE 2

UV treatment on reactor grade and mechanically blended TPO without UV stabilizers showed that wettability of reactor grade TPO could be improved while not that of the mechanically blended TPO. It was also shown that water droplets on the surface of reactor grade TPO enhanced the extent of modification and modification rates.

Table 5 compares the UV radiation exposure effects for reactor grade TPO's without UV stabilizers against those that contain UV stabilizers.

TABLE 5

Contact angle measurements on reactor grade thermoplastic olefin

| Sample/Treatment Conditions | Water Contact Angle (degrees) | |
|---|---|---|
| | TPO control | TPO control + UV stabilizer |
| baseline | 93 | 101 |
| UV @ t = 4 min, d = 2 cms | 85 | 94 |
| UV @ t = 4 min, d = 2 cms with water droplets on the surface | 78 | N.D.* |
| UV @ t = 6 min, d = 2 cms with water droplets on the surface | N.D.* | 93 |
| UV @ t = 4 min, d = 2 cms and ozone from ozone generator | 89 | 88 |
| UV @ t = 4 min, d = 2 cms and ozone from ozone generator | 76 | 82 |

*Not determined

It is noted that the initial value of the de-ionized water contact angle is higher for the TPO containing UV stabilizers. It was also observed that UV modifies the substrates containing the UV stabilizers, although to a slightly lesser extent. The contact angles achieved after UV treatment of the reactor grade TPO's are similar to those obtained using propane flame treatment (76°) on reactor grade TPO's.

From the above listed tables, it is noted that water has a synergistic effect with UV radiation for certain polymer substrates. Thus, some experiments were carried out to determine whether any other chemicals other than water, in the presence of UV, causes an increase in the substrate's wettability. Tables 6 and 7 list the preliminary results for the effect of droplets of different strengths of hydrogen peroxide solution on mechanical and reactor grade TPO substrate surfaces. Standard hydrogen peroxide solution is in water and is available at 30% strength. Preliminary conclusions from these experiments show that dilute solutions of hydrogen peroxide enhances UV modification slightly.

TABLE 6

Effect of hydrogen peroxide in the presence of UV on contact angle measurements for mechanical grade thermoplastic olefin

| Sample/Treatment Conditions | Water Contact Angle (degrees) |
|---|---|
| control | 90 |
| UV @ t = 6.75 min, d = 2 cms | 93 |
| UV @ t = 6.75 min, d = 2 cms, with 8.5% strength hydrogen peroxide droplets on the surface | 88 |
| UV @ t = 6 min, d = 2 cms, with 15% strength hydrogen peroxide droplets on the surface | 88 |
| UV @ t = 6 min, d = 2 cms, with 6% strength hydrogen peroxide droplets on the surface | 84 |

TABLE 7

Effect of hydrogen peroxide in the presence of UV on contact angle measurements for reactor grade thermoplastic olefin

| Sample/Treatment Conditions | Water Contact Angle (degrees) |
|---|---|
| control | 93 |
| UV @ t = 4 min, d = 2 cms | 85 |
| UV @ t = 30 min, d = 2 cms | 86 |
| UV @ t = 4.5 min, d = 2 cms, with 3% strength hydrogen peroxide droplets on the surface | 83 |
| UV @ t = 5 min, d = 2 cms, with 6% strength hydrogen peroxide droplets on the surface | 85 |
| UV @ t = 6.0 min, d = 2 cms, with 15% strength hydrogen peroxide droplets on the surface | 88.5 |

Figure 15A:
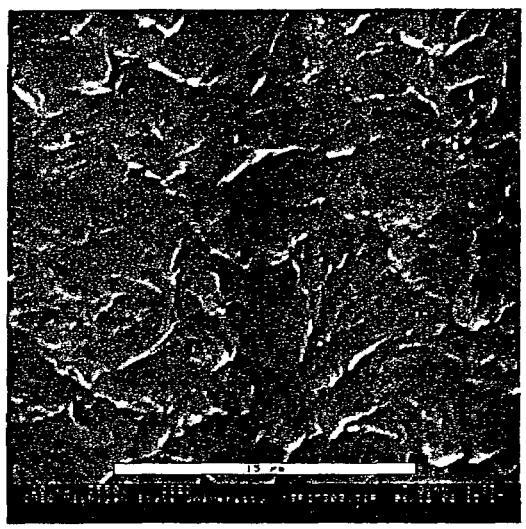
FIGS. 15A and 15B are ESEM images of the molded surfaces of toluene etched mechanical grade TPO (FIG. 15A) and reactor grade TPO (FIG. 15B) samples.
Figure 15B:
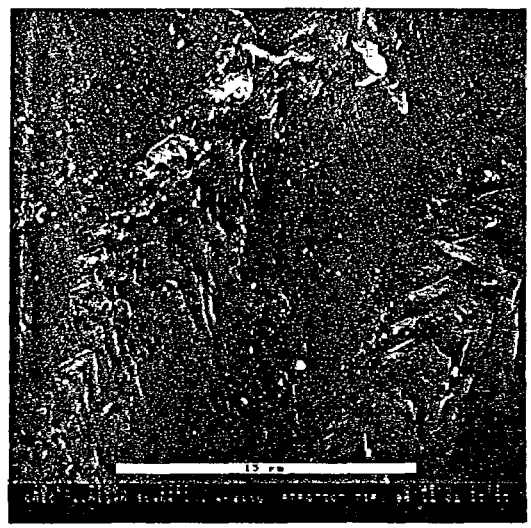

FIGS. 14A to 14D are the ESEM images for reactor grade TPO and mechanical grade TPO samples. The images are of the top surface of the injection molded substrates. The ESEM images show that except for the reactor grade TPO's surface which appears to be rougher, there are no significant differences between the two grades of TPO. Also from FIGS. 14A to 14D, it is not possible to distinguish the dispersed elastomer phase from the polypropylene matrix. Even when the ESEM was operated in the back-scattered mode, the two phases were not able to be distinguished from each other. To distinguish the elastomer phase from the polypropylene, the TPO samples were placed in toluene for different times at room temperature. Toluene selectively etches the elastomer phase, and one is able to distinguish the two phases. This is shown in FIGS. 15A to 15B. The ESEM images are of the top surface of the injection molded TPO substrates. On toluene etching, it is observed that the resultant morphology for the two grades of TPO are different.

Figure 16:
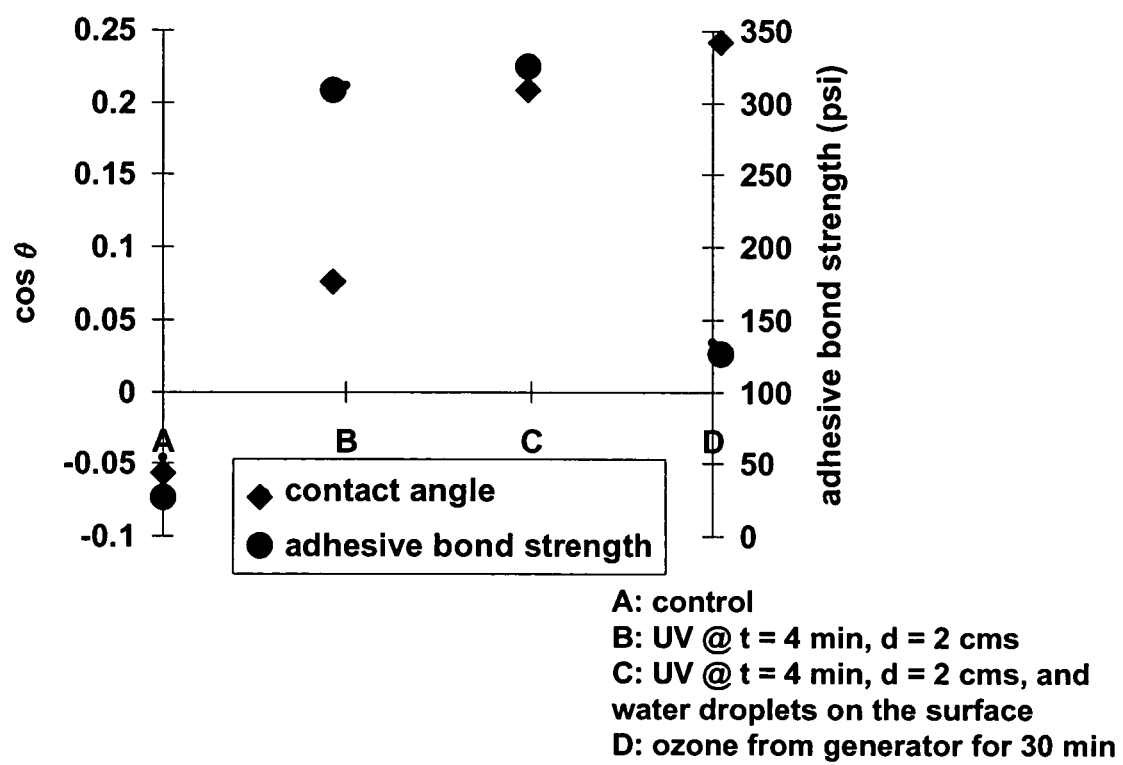
FIG. 16 is a graph showing the effect of UV treatment on wettability (cos θ) and adhesive bond strength of reactor grade TPO (without UV stabilizers).

To determine whether UV treatment affected adhesive bond strength, PATTI experiments were carried out on reactor and mechanically blended grades of TPO as shown in FIG. 16. FIG. 16 is a plot of adhesive bond strength and wettability versus treatment conditions. In reactor grade PTO, wettability in this figure is indicated by the cosine of the contact angle (cos(θ)) made by deionized water. From FIG. 16, it is observed that for certain conditions the adhesive bond strength improved even if the wettability did not improve.

Figure 17:
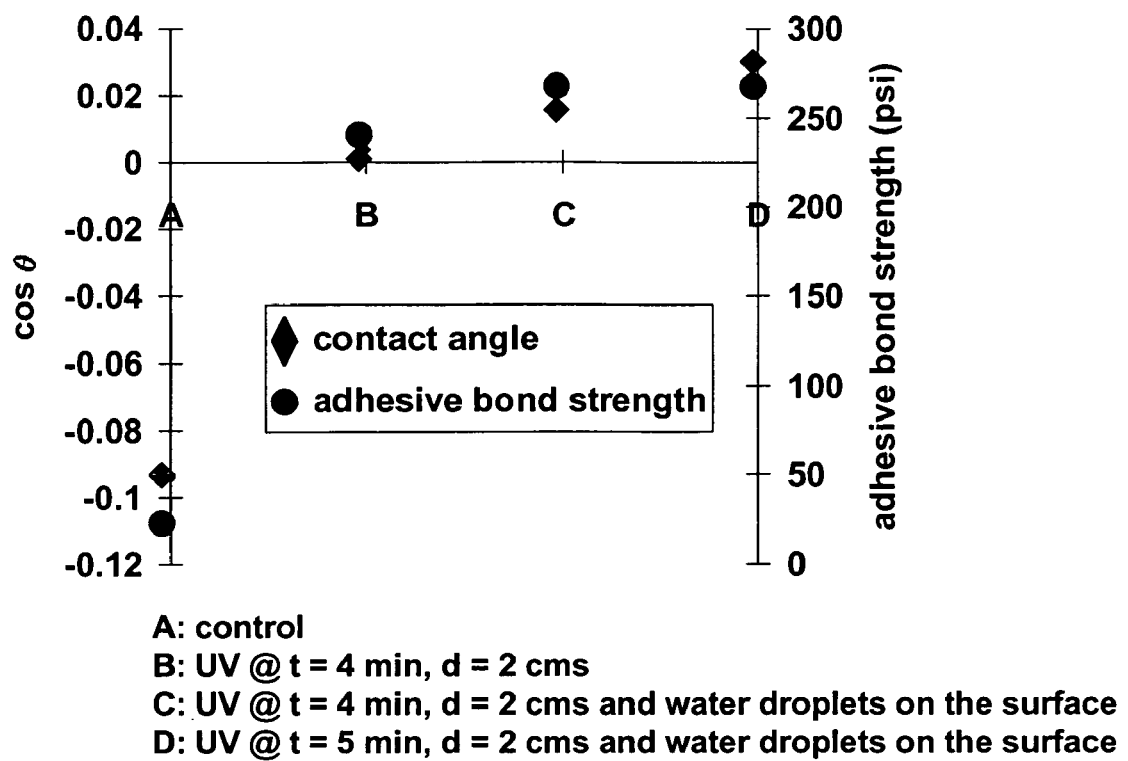
Figure 20:
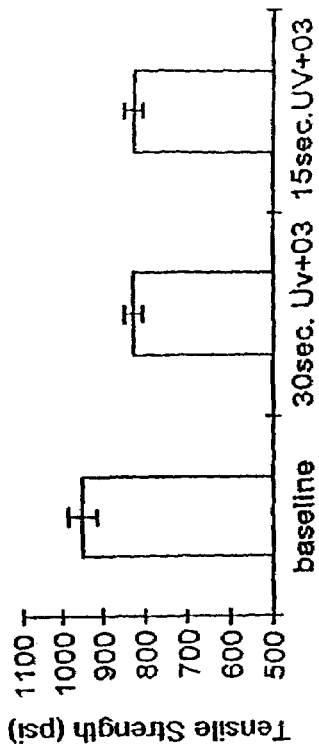
FIGS. 20 and 21 are graphs showing pull test measurements.
Figure 21:
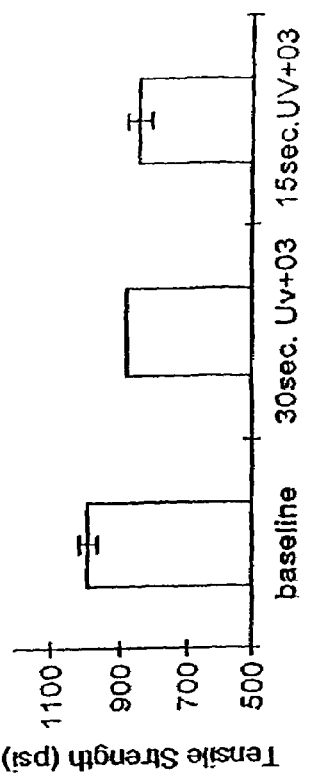

Even if wettability did not change for certain UV treatment conditions, the adhesive bond strength showed improvement. The TPO's being studied here are made up of a polypropylene matrix in which an elastomer is dispersed. To identify the role played by the polypropylene matrix during UV treatments of TPO, PATTI tests were conducted on control and UV treated polypropylene samples. FIG. 17 shows a plot of adhesion strength and wettability versus UV treatment conditions for polypropylene. It was observed that for the conditions studied, though the wettability did not significantly increase, the adhesive bond strength has improved after UV treatment.

The polypropylene and TPO samples contain an anti-oxidant package. These anti-oxidant materials may be preventing nascent oxygen from attacking the sites where surface bonds are broken by UV radiation. Due to this, wettability of the substrates might not have improved significantly. The other possible reason is that in polypropylene based materials, a competing mechanism like crosslinking of the substrate surface might be occurring. Due to this, the weak boundary layer might have cross-linked in polypropylene and hence the adhesive bond strength might have improved. Similarly in the case of injection molded TPO's, the dispersed elastomer migrates from surface and the surface (or skin) is dominated by polypropylene. Hence even for TPO's, it may be hypothesized that under some conditions surface cross-linking occurs. ESEM is also being used to characterize the failure surfaces of the PATTI tested samples and determine the locus of failure. XPS will be used to confirm the results obtained from ESEM.

Overall, from the PATTI tests it was observed that UV treatment caused enhancement in the adhesive bond strength and also a change in the failure mode. PATTI tests and a preliminary ESEM analysis of failure surfaces revealed that mechanically blended TPO and reactor grade TPO failed differently. This may be correlated to the morphology of the TPO which in turn is a function of how they are manufactured and processed. PATTI tests carried out on polypropylene highlight that UV treatment enhances bond strength.

The wettability of polymeric substrates like polycarbonate, reactor grade thermoplastic olefin (TPO), polypropylene and vinyl ester matrix was increased after UV modification. This was indicated by a decrease in the contact angle of de-ionized water. The extent of UV modification was found to be dependent on distance (d) between lamp and substrate (i.e. intensity of radiation falling on the substrate), exposure time (t), ozone concentration, presence of water droplets, presence of UV stabilizers and nature of the substrate.

The presence of water droplets on the substrate surface was found to enhance the UV modification of certain polymers as well as increase the UV modification rates. This was found to be true for both reactor grade TPO and polycarbonate. The extent of improvement for polypropylene was to a lesser extent, while for mechanical grade TPO, the presence of water did not make any difference.

Experiments with hydrogen peroxide solution were undertaken to explore the effect of the presence of other fluids during UV radiation of polymeric substrates. The presence of hydrogen peroxide solution droplets on substrate surfaces of reactor and mechanical grade TPO's and polypropylene was found to affect UV treatment. Preliminary findings showed that the lower the concentration of hydrogen peroxide solution, the larger was the UV modifications of the substrate surfaces.

Besides wettability and surface chemical composition being altered, AFM of UV treated polycarbonate samples showed a change in surface morphology (FIG. 12B). This change was seen as an increase in the number of peaks and valleys as a function of the intensity of UV treatment condition.

The adhesive bond between the polymer substrate surface and the aluminum stub showed varying strengths for different UV treatment conditions. In most cases, the UV treated samples showed higher bond strengths than baseline samples. The increase in adhesive bond strength was as high as 200–600%. This was found to be the case for polycarbonate, reactor and mechanical grade TPO, and polypropylene samples.

UV treatment was found to be stable over time for polycarbonate. On washing/rinsing these UV treated samples in de-ionized water, the substrate surfaces did change their contact angles. Yet, the resultant contact angle was found to be smaller (or surface more wettable) than those of the baseline samples.

ESEM of TPO has shown that the morphology of reactor grade TPO might be different from mechanical grade TPO. This might explain why UV treatment shows a different effect on them. ESEM has also been used to characterize polymer surfaces after PATTI testing to determine nature and locus of failure.

EXAMPLE 3

This example shows the effect of adding supplemental ozone to the environment under the UV lamp on tire rubber. Rubber samples were cut into 1 inch×1 inch squares prior to treatment. The distance between the sample surface and the UV lamp was kept at 20 mm. Treatment times ranging from 30 seconds to 4 minutes were evaluated. After treatment, the contact angle of pure deionized water with the rubber was measured using a contact angle goniometer (Rame-Hart Inc.). All the contact angle measurements were performed one (1) hour after treatment.

The treatment was evaluated for different environments like air, ozone and water for various times. The ozone was fed into the treatment area directly from the ozone generator via a tube. To keep the sample temperature low and prevent thermal damage to the polymer, the samples were exposed to UV light in stages. This is off and on pulsed where the sample is exposed for a certain amount of time, the light is turned off and the sample is allowed to cool. This step is repeated till the required amount of total exposure is achieved.

The various treatment conditions used and the results are tabulated in Table 8. A reduction in contact angle was observed in all samples exposed to UV light. The reduction in contact angles was seen to be directly dependent on the treatment time.

TABLE 8

Various UV Treatment Conditions Used for Cured
(Vulcanized) Tire Rubber and Resulting Contact Angles

| Treatment Conditions | | | Contact | Temperature |
|---|---|---|---|---|
| Distance | Time | Environment | Angle | (C.) |
| | | untreated | 121 | 25 |
| 20 mm | 2 min | UV + Ozone | 31 | 101 |
| 20 mm | 2 min | UV + Ozone 30 sec on/30 sec off Pulsed | 20 | 74 |

The following Examples 4, 5 and 6 show the effect of adding supplemental ozone to the environment under the UV lamp illuminating the sample surface and short illumination times.

EXAMPLE 4

TABLE 9

UV Treatment of Polyimide (Kapton 500-HN)

| Treatment | Contact Angle | Cos($\theta$) |
|---|---|---|
| Control | 61.75 ± 3.75 | 0.473 |
| UV (30s) | 56.4 ± 11.1 | 0.553 |
| UV (60s) | 47.8 ± 2.3 | 0.672 |
| UV (120s) | 45.6 ± 8.45 | 0.699 |
| UV & Ozone (30s) | 49.2 ± 10.3 | 0.653 |
| UV & Ozone (60s) | 35.75 ± 2.6 | 0.811 |
| UV & Ozone (120s) | 31.8 ± 3.34 | 0.849 |

EXAMPLE 5

TABLE 10

UV Treatment of Ultra-High Molecular Weight Polyethylene

| Treatment | Contact Angle | Cos($\theta$) | Pull-off Strength (psi) |
|---|---|---|---|
| Control | 100.2 ± 8.1 | −0.177 | 145 ± 20 |
| UV (30s) | 94.6 ± 2.05 | −0.080 | |
| UV (60s) | 98.25 ± 3.9 | −0.143 | |
| UV (120s) | 98.6 ± 5.8 | −0.149 | |
| UV & Ozone (30s) | 97.2 ± 4.1 | −0.125 | |
| UV & Ozone (60s) | 93.5 ± 3.2 | −0.061 | |
| UV & Ozone (120s) | 88.11 ± 2.0 | 0.032 | 390 ± 55 |

EXAMPLE 6

TABLE 11

Ultra-High Molecular Weight Polyethylene Debond Strength

| Treatment | Pull-off Strength (psi) |
|---|---|
| Control | 145 ± 20 |
| UV & Ozone (120s) | 390 ± 55 |
| UV & Ozone (180s) | 320 ± 80 |
| UV & Ozone (240s) | 400 ± 120 |

The following Examples 7, 8 and 9 show the effect of ultraviolet light and short time treatments on metals.

EXAMPLE 7

TABLE 12

Contact Angles of 110 Copper UV and Ozone Treatment

| Treatment Time(s) | Contact Angle | Cos($\theta$) |
|---|---|---|
| 0 (Control) | 85.4 ± 1.0 | 0.080 |
| 10 | 80.0 ± 4.6 | 0.174 |
| 15 | 65.7 ± 2.3 | 0.411 |
| 30 | 56.1 ± 2.7 | 0.558 |
| 45 | 39.4 ± 3.9 | 0.773 |
| 60 | 37.0 ± 2.9 | 0.798 |
| 90 | 26.4 ± 6.2 | 0.896 |
| 120 | 23.1 ± 2.8 | 0.920 |
| 150 | 34.9 ± 4.4 | 0.820 |
| 180 | 17.1 ± 0.9 | 0.956 |

EXAMPLE 8

TABLE 13

Contact Angles of Commercially Oxidized Copper UV and Ozone Treatment Brown Oxide

| Treatment Time(s) | Contact Angle | Cos($\theta$) |
|---|---|---|
| 0 (Control) | 128.4 ± 6.2 | −0.621 |
| 5 | 115.8 ± 8.1 | −0.435 |
| 15 | 7.0 ± 2.3 | 0.992 |
| 30 | Complete Wetting | — |

EXAMPLE 9

TABLE 14

Contact Angles of Commercially Oxidized Copper UV and Ozone Treatment Black Oxide (Light Side)

| Treatment Time(s) | Contact Angle | Cos($\theta$) |
|---|---|---|
| 0 (Control) | 95.0 ± 3.2 | −0.087 |
| 15 | 40.1 ± 5.6 | −0.765 |
| 30 | 13.1 ± 2.4 | 0.973 |
| 45 | Complete Wetting | — |

EXAMPLE 10

TABLE 15

Contact Angles of UV and Ozone Treatment of Polypropylene (PP), Mechanical Grade Thermoplastic Polyolefin (MTPO) and Reactor Grade Thermoplastic Polyolefin (RTPO)

| Specimen | Contact Angle (θ) | Cosθ |
|---|---|---|
| PP Control | 96.0 ± 3.1 | −0.104 |
| PP (120s) | 84.6 ± 2.3 | 0.094 |
| PP (240s) | 89.9 ± 3.5 | 0.003 |
| MTPO Control | 90.2 ± 1.5 | −0.003 |
| MTPO (120s) | 89.7 ± 1.0 | 0.005 |
| MTPO (240s) | 82.9 ± 1.8 | 0.124 |
| RTPO Control | 93.7 ± 2.3 | −0.052 |
| RTPO (120s) | 92.0 ± 3.8 | −0.035 |
| RTPO (240s) | 81.8 ± 1.9 | 0.143 |

TABLE 16

Contact Angles of UV and Ozone Intermittent Treatment of Polypropylene, Mechanical Grade Thermoplastic Polyolefin and Reactor Grade Thermoplastic Polyolefin

| Material | Contact Angle (120 second Exposure) | Contact Angle (240 second Exposure) |
|---|---|---|
| PP | 84.6 ± 2.8 | 89.9 ± 2.7 |
| MTPO | 89.7 ± 0.4 | 82.9 ± 2.0 |
| RTPO | 92.0 ± 3.2 | 81.8 ± 1.6 |

EXAMPLE 11

Ultraviolet light irradiation offers promise as a method to treat metallic surfaces in preparation for subsequent operations involving adhesive bonding or priming and coating. In a series of laboratory investigations, three aluminum compounds were investigated for changes in surface wettability following exposure to ultraviolet light irradiation. Aluminum 1100 is pure aluminum, alloy 6061 is a specialty alloy used in many aerospace applications, and A356 is a cast alloy used in auto wheels. The samples were subjected to ultraviolet irradiation from a pulsed xenon lamp for various time periods. One series of experiments was carried out in ambient air, and another set of exposures were completed with an ozone enriched atmosphere. The contact angle with water was used to evaluate changes in surface properties as a function of ultraviolet light treatment. Data are reported in Table 9. In all cases the contact angle was observed to decrease following UV irradiation. The ability of UV irradiation to lower the contact angle of water on aluminum substrates was enhanced in the presence of ozone. In one ongoing study, the contact angle of A356 is substantially lower following two weeks aging after treatment.

TABLE 17

Effect of UV treatment time on the contact angle of water on aluminum substrates[1]

| | | Treatment Atmosphere | |
|---|---|---|---|
| Alloy | UV Exposure Time minutes | Air Contact Angle degrees | Ozone[2] Contact Angle degrees |
| Aluminum 1100 | 0 | 85.8 | 82.5 |
| | 1 | 71.9 | 67.0 |
| | 3 | 73.2 | 35.3 |
| | 5 | 63.7 | 24.0 |
| | 10 | 22.7 | 19.8 |
| Aluminum 6061 | 0 | 37.6 | 36.2 |
| | 1 | 28.1 | 19.3 |
| | 3 | 27.0 | 16.8 |
| | 5 | 26.7 | 18.3 |
| | 10 | 25.0 | 16.7 |
| Aluminum A356 | 0 | 65.4 | 57.8 |
| | 1 | 50.1 | 29.9 |
| | 3 | 33.3 | 23.1 |
| | 5 | 28.8 | 23.9 |
| | 10 | 17.1 | 14.6 |
| A356 10 min UV Treatment in Ozone, following 2 weeks aging after treatment | | | 38.0 |

[1]Xenon pulsed lamp, quartz filter, lamp to surface distance of 2 cm; contact angle measurements collected immediately following treatment, except as noted.
[2]Ozone flow rate of 30 standard cubic feet per hour.

EXAMPLE 12

This example details how laboratory-controlled surface modifications of epoxy coatings with UV/ozone treatments can be utilized to beneficially affect paint adhesion. Previous studies demonstrated that surface modifications, brought about by gaseous species present in a bake oven cure environment, can effect the surface chemistry of urethane-crosslinked epoxy coatings, and favorably influence their adhesion to applied melamine-crosslinked polyester coatings. In the present invention, epoxy-coated panels were subjected to varying degrees of UV/ozone exposure, and the effects of the treatments on adhesion to the polyester coating was then evaluated. X-ray photoelectron spectroscopy (XPS) was used to characterize the reacted epoxy surfaces, and interfacially-generated epoxy/polyester surfaces, as a function of UV/ozone exposure time in order to gain a chemical insight as to how the surface treatments beneficially effect adhesion. It was revealed that polyester/epoxy adhesion improves noticeably with exposure to ozone alone, and dramatically under exposures to UV/ozone. XPS identified that increased UV/ozone exposure of the epoxy resulted in higher amounts of surface carboxylate species, and a depletion in a polyether surface-segregated overlayer present on the epoxy coating. Lesser amounts of polyether material were present at the interfaces of coating systems exhibiting better intercoat adhesion.

Additives are routinely incorporated into paint formulations to improve properties such as appearance and rheology. Surface segregation of these additives can occur during the cure process. The amount of segregation is influenced by the nature of the polymers comprising the coating and the manner in which the coating is processed. This phenomenon can produce deleterious effects on adhesions to the subsequently applied paint layer. One example is a polyether crater-control additive (CCA) found in some commercial epoxy-based paints. This CCA surface-segregates when the paint is cured, creating a surface of relatively low polarity with poor adhesion characteristics. A previous study revealed that this surface overlayer is partially removed, when the paint is cured using a gas-fired oven, by a reaction with nitrogen oxides produced in the combustion of methane with air. The adhesion properties of this "surface-modified" epoxy were significantly improved over the same paint cured using an electric oven (where the surface CCA remains intact after cure in the "inert" air environment). However, it is not necessarily desirable to rely on fortuitous chemistry occurring during bake oven cure to insure proper intercoat adhesion in multi-layered paint systems.

Controlled laboratory UV/ozone treatments were used to enhance the adhesion properties of a commercial epoxy-based paint (cured using an electric oven). Epoxy-coated panels were subjected to varying degrees of UV/ozone exposure, and the effects of the treatments on adhesion to an applied polyester coating were then evaluated. X-ray photoelectron spectroscopy (XPS) was used to determine the chemical changes present on the reacted epoxy surfaces and interfacially-generated epoxy-polyester surfaces as a function of UV/ozone exposure time. The experiments provided a chemical insight as to how the surface treatments enhance adhesion performance. In addition, contact angle measurements were made to assess the effects of the UV/ozone treatments on surface wettability. Both the XPS and contact angle measurements were correlated to adhesion/tape pull results obtained on polyester applied to epoxy-based paints.

UV/ozone treatments were accomplished using a 180–320 nm wavelength xenon flashlamp (Xenon Corporation) with an external ozone generator (Ozotech Corporation) using oxygen as the source gas. Chemical characterizations by XPS were made using an AXIS 165 Electron Spectrometer manufactured by Kratos Analytical, Manchester, England, using a monochromatic Al Kα (1486.6 eV) X-ray source. Contact angle measurements were carried out using a Rame-Hart goniometer with deionized water as the testing liquid. Scribe and cross-hatch adhesion/tape-pull testing (FLTM BI 106-01) was conducted on complete paint systems consisting of commercial epoxy, polyester and urethane base-coat/top-coat layers.

The polyether CCA is high in ether content.

An increased amount of ether is observed on the surface of the electric-oven cured epoxy relative to the bulk epoxy, which itself has ether moieties due to its epoxy formulation. Gas-oven cure removes much of the CCA without actually oxidizing the surface, as is revealed in a reduced ether content without an enhancement in carboxylate.

TABLE 18

Contact angle measurements of epoxy paint after UV/ozone exposure

| Treatment | (θ) |
|---|---|
| Initial | 68.7 |
| 60s ozone | 68.7 |
| 15s UV/ozone | 62.6 |
| 30s UV/ozone | 59.5 |
| 60s UV/ozone | 51.5 |

Scribe and cross-hatch adhesion/tape pull testing (PATTI) revealed that the polyester paint easily delaminates from the initial untreated electric-oven cured epoxy surface. Only partial delamination occurs after exposure to ozone alone. After exposure to UV/ozone, it was not possible to generate the epoxy/polyester interface at room temperature. The system could only be forced to fracture after applying artificial stresses through immersion in liquid nitrogen (See FIGS. 18 to 21). Comparing interfaces generated from the initial, 60 s ozone, and 15 s UV/ozone exposed samples (data not shown), XPS identified an excess amount of ether at the interfacial surfaces, which was attributed to the CCA. The level of ether (CCA) measured varied inversely relative to the observed epoxy/polyester intercoat adhesion strengths.

Exposure of the electric-oven cured epoxy to ozone alone improves adhesion to the polyester paint, while UV/ozone exposure improves adhesion to the point where interfacial paint failure cannot be generated. XPS surface characterization reveals that UV/ozone oxidatively removes the polyether-based CCA overlayer from the electric-oven cured epoxy paint. The majority of the carboxylate debris formed is not cross-linked into the bulk epoxy, since it can be removed by a base rinse. Improved adhesion properties of the epoxy can be attributed both to removal of surface CCA, and to the production of some polar surface carboxylate species that remain cross-linked into the bulk epoxy.

EXAMPLE 13

The focus of this experiment is to study the influence of ozone on UV treatment of glass fiber filled (PET) composite and to optimize process times to make this process effective.

Procedure

A pulsed Xenon lamp and powder supply (Xenon Corporation) was used as a source for UV radiation. It is capable of providing emissions below 185 nm. Changes in the ambient were introduced through presence of ozone from an external ozone generator (Ozotech, Inc.). Photons, usually those with low wavelength, are energetic species which are used to activate many chemical reactions. The mechanisms for ozone formation and destruction in the presence of UV light are as follows.

$$O_2 + h\nu\ (184.9\ nm) \rightarrow O_2^*$$

$$O_2^* \rightarrow 2O$$

$$2O + O_2 \rightarrow O_3$$

$$O_3 + h\nu\ (253.7\ nm) \rightarrow O + O_2$$

Active atomic oxygen and ozone are capable of reacting with substrate and increasing its surface energy.

The material to be evaluated in this study was RYNITE® 530 thermoplastic, a 30% glass reinforced modified PET composite from DuPont (Wilmington, Del.). Equilibrium contact angle of water prior to and after UV treatment were measured using the Rame-Hart goniometer apparatus. Adhesive bonding properties were decided using the PATTI (pneumatic adhesion tensile testing instrument) tester. Surface chemistry change were given by XPS results.

Results

PET surface wettability as a function of various UV treatments is shown in Table 20. It was observed that PET control sample does not wet. UV exposure did help increase the wettability of the surface. Addition of applying ozone and exposing UV was seen more significantly improving the surface wetting characteristics. The longer the exposure time is, the lower the contact angle becomes.

The contact angle measurement results were correlated to adhesion bonding improvement. The polymer samples were bonded to aluminum stubs using an epoxy structural adhesive, ARALDITE AW106 with hardener HV953 (from Ciba Geigy Corporation). As shown in Table 21, the adhesion bonding first increases with increasing of wettability, then decrease with further increasing of wettability. It seems that over UV exposure will not benefit the adhesion improvement.

Surface chemistry composition changes were detected via XPS. From Table 22 it is seen that the C/O ratio increased due to the UV exposure indicating more oxygen contained functional group formed on the surface. The XPS results showed that the reason for the adhesion improvement was because the increase of polar functional group on the surface caused by UV ozone exposure. Table 23 lists the distribution of surface functional group change prior to and after the UV treatment. Good adhesion corresponded to a high C—O and C—OOH group concentrations.

TABLE 20

Contact angle measurements for Rynite 530

| Sample | Contact angle (degree) |
| --- | --- |
| Control | 75 |
| t = 2 min, d = 2 cm | 62 |
| t = 2 min, d = 2 cm with ozone | 58 |
| t = 4 min, d = 2 cm with ozone | 57 |
| t = 4 min, d = 1 cm with ozone | 46 |

TABLE 21

Adhesion Bonding for Rynite 530 via PATTI Test

| Sample | Pull-off Tensile Strength (psi) |
| --- | --- |
| control | 564 |
| t = 2 min, d = 2 cm | 810 |
| t = 2 min, d = 2 cm with ozone | 908 |
| t = 4 min, d = 2 cm with ozone | 973 |
| t = 4 min, d = 1 cm with ozone | 851 |

TABLE 22

Surface Composition C/O Ratio for Rynite 530 Via XPS

| Sample | C/O |
| --- | --- |
| control | 0.35 |
| t = 4 mi, d = 2 cm with ozone | 0.53 |
| t = 4 min, d = 1 cm with ozone | 0.52 |

TABLE 23

Surface Functional Group Distribution Based on C 1s Curve Fitting

| | Control | t = 4 min, d = 2 cm with ozone | t = 4 min, d = 1 cm with ozone |
| --- | --- | --- | --- |
| CHX | 67.4 | 47.6 | 56.6 |
| C—O | 20.4 | 32.1 | 21.1 |
| C=O | 1.89 | 2.1 | 3.6 |
| COOH | 9.1 | 17.1 | 17.2 |

EXAMPLE 14

A pulsed Xenon lamp and power supply obtained from Xenon Corporation was used as a source for UV radiation. It was capable of providing emissions below 185 nm. Changes in the ambient were introduced through presence of ozone from an external ozone generator (Ozotech, Inc.) and water. The other variables that might affect the extent of polymer surface modification were: distance of the lamp from the substrate surface (d), radiation exposure time (t), intensity of lamp radiation. The material evaluated in this experiment was Rynite 530, a 30% glass reinforced modified PET composite from DuPont.

On exposure to various UV treatments the substrate was characterized for wettability, surface chemical composition, and adhesive bonding. Contact angle measurements, a measure of wettability were carried out using a Rame-Hart goniometer with de-ionized water as the testing liquid. For each condition, 9–10 measurements of the contact angle were taken. Contact angle measurements were only sensitive to changes in the top 2 nm of the surface, and they do not reveal much about the surface chemical composition. Hence, X-ray photoelectron spectroscopy (XPS) was carried out on the control and the UV treated samples. The instruments used for the characterizations was a Perkin-Elmer Physical Electronics PHI5400 ESCA Spectrometer equipped with both a standard Mg K$\alpha_{1,2}$ X-ray source and a monochromated Al K$\alpha_{1,2}$ X-ray source, and an electron flood gun for neutralization. The instrument used a 180° hemispherical energy analyzer operated in the fixed analyzer mode and a position sensitive detector. The optimum spot size for the conditions used was the 1.00 mm diameter aperture. The monochromic source was used since it provides better resolution for data collection. A molybdenum mask was also employed to assist in neutralizing the charging.

The substrate surfaces prior to and after UV treatment were also characterized for adhesive bonding properties using a PATTI (pneumatic adhesion tensile testing instrument) tester. The tests were carried out using PATTI-2A made by SEMicro division, M. E. Taylor Engineering, Inc. The PATTI instrument and method confirms to ASTM D4541, "Pull-off strength of coatings using portable adhesion tests". The polymer samples were bonded to aluminum stubs using an epoxy structural adhesive. ARALDITE AW106 with hardener HV953 (from Ciba Geigy Corporation). The adhesive was allowed to cure for more than 15 hours at room temperature. Five or more samples were tested for each condition. Results from the adhesion tests were correlated to the contact angle measurements.

Figure 22:
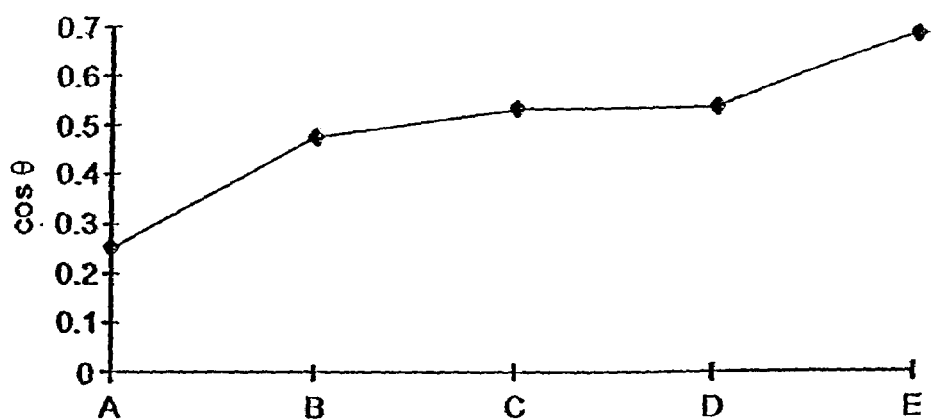
FIG. 22 is a graph showing contact angle change prior to and after UV/Ozone treatment
A Baseline
B t=2 mins, d=2 cm
C t=2 mins, d=2 cm with ozone
D t=4 mins, d=2 cm with ozone
E t=4 mins, d=1 m with ozone

FIG. 22 is a plot of cosine of the contact angle (θ) versus treatment conditions for PET with or without ozone presence. Here, modification is measured by the substrate's wettability. A surface is said to be perfectly wettable if θ is equal to zero. As θ increases, the degree of wettability decreases. It was observed that PET control sample did not wet. UV exposure did help increase the wettability of the surface. Addition of applying ozone was seen more significantly improving the surface wetting characteristics. An increase in the intensity of radiation (obtained by decreasing the distance between the substrate and the lamp surface) or an increase in the exposure time, increased the extent of modification.

The ozone influence of UV treatment was enhanced by applying water droplets on the substrate surface. Ozone is 12.5 times more soluble in water than oxygen. Decomposition of ozone in water, as shown in fellow, produces free radicals ($HO_2$. and HO.) which can react with substrate surface.

$$O_3 + H_2O \rightarrow HO_3 + OH^- \quad (5)$$

$$HO_3 + OH \rightarrow 2HO_2 \quad (6)$$

$$O_3 + HO_2 \rightarrow HO + 2O_2 \quad (7)$$

Figure 23:
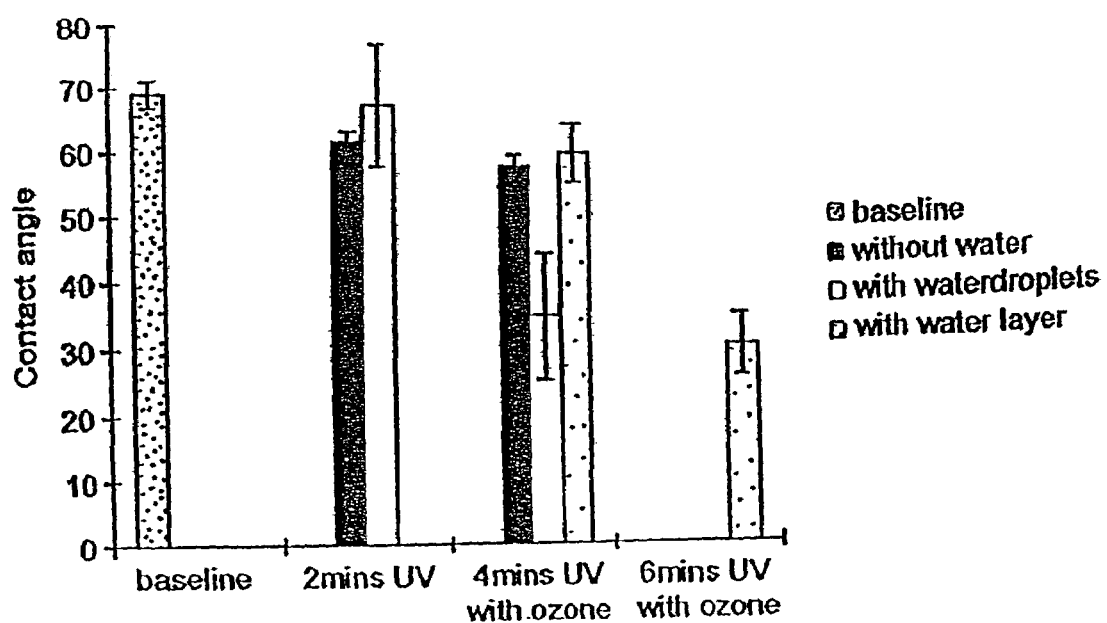
FIG. 23 is a graph showing wettability change presence/absence water during UV/Ozone treatment.

Water droplets caused uneven treated surfaces unless dispensed on the surface in very small droplets. An uniform thin water layer saturated with ozone on the substrate significantly increased the extent of modification if a correct UV exposure time was used and a much more uniform modified surface was obtained. FIG. 23 is a plot comparing the wettability change with or without water under same UV exposure condition. Presence of water droplets dramatically decreased the contact angle, inhomogeneous surface was obtained (as shown in error bar). A thin layer of water layer saturated with ozone generated a more uniform surface. However, longer UV exposure time was needed to create the same modification. UV exposure shorter than necessary did not effect the contact angle change.

Figure 24:
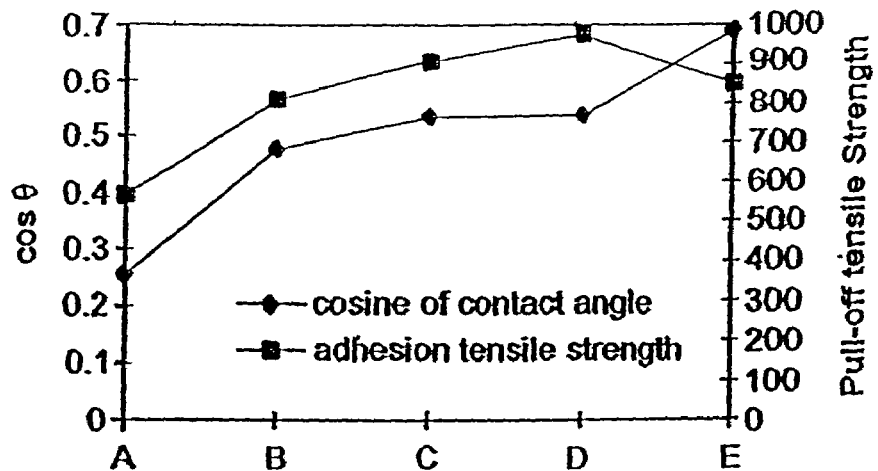
FIG. 24 is a graph showing the correlation of contact angle and adhesion change.
A Baseline
B t=2 mins, d=2 cm
C t=2 mins, d=2 cm with ozone
D t=4 mins, d=2 cm with ozone
E t=4 mins, d=1 m with ozone

The contact angle measurement results were correlated to adhesion bonding improvement. The polymer samples were bonded to aluminum stubs using an epoxy structural adhesive, ARALDITE AW106 with hardener HV953 (from Ciba Geigy Corporation). As shown in FIG. 24, adhesion tensile strength increased with increasing of wettability, then decreased with further increasing of wettability due to the over UV exposure of the surface.

Figure 25:
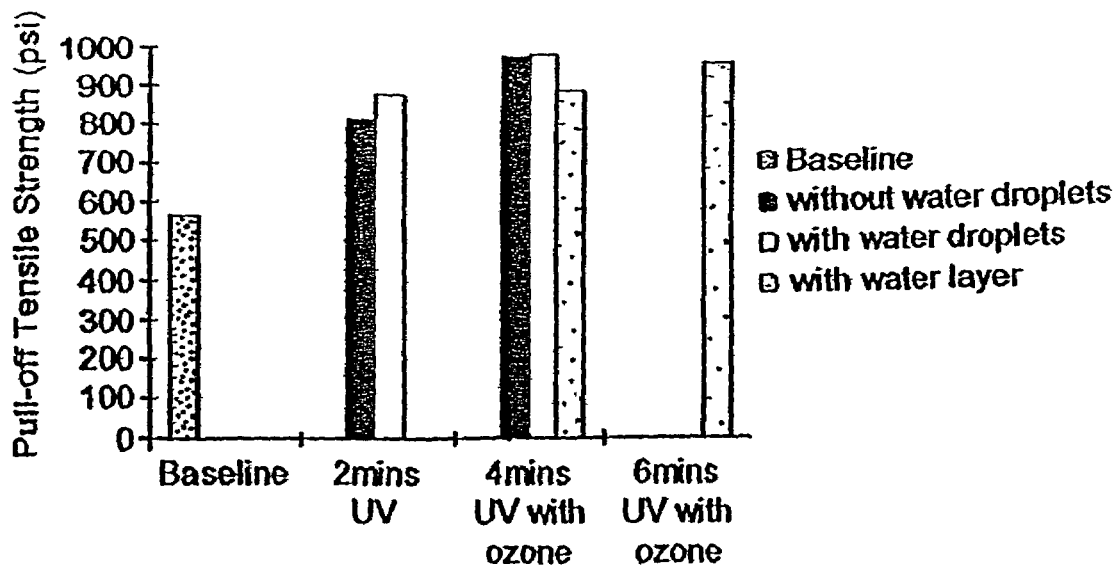
FIG. 25 is a graph showing the affect of water and ozone on adhesion.

Although the presence of water droplets showed positive effect on wettability improvement, adhesion property did not show as much difference. All the UV treated samples gave excellent adhesion. Samples showed cohesive failure at PET matrix. The results are shown in FIG. 25.

UV/ozone as a high speed, low cost surface modification method showed a positive surface bonding improvement on PET/glass fiber enforced composites. The intensity of radiation, exposure time and presence of water will all influence the surface treatment results. Surface chemistry change is detected after UV exposure. UV exposure will benefit the interfacial bonding because of the increase of polar functional group on the surface.

EXAMPLE 15

This example shows the results for the covalent bonding of silyl groups to the surface of a 20% glass fiber-reinforced PET substrate by exposing the substrate to ultraviolet light while the substrate was immersed in a solution containing silane and water or UV treating the substrate and then immersing the UV treated substrate in the solution containing silane and water.

The 20% glass fiber-reinforced PET (Tg=89° C.) is a thermoplastic polymer that was obtained from TICONA (Summit, N.J.). The adhesive used for the PATTI tests was an ARALDITE epoxy adhesive (Vantico, Inc., Brewster, N.Y.). The silane that was used was Dow Corning Z-6020 (Dow Corning, Midland, Mich.) which is (N-(β-aminoethyl)-γ-aminopropyl-trimethoxysilane). The chemical formula of the silane is $(CH_3O)_3SiCH_2CH_2CH_2NHCH_2CH_2CH_2NH_2$. A pulsed Xenon lamp and power supply, obtained from Xenon Corporation, was used as a source for UV radiation. It was capable of providing emissions below 185 nm. Changes in the ambient environment were introduced through presence of ozone from an external ozone generator (Ozotech, Inc.) and water containing the silane. For some experiments, the glass fiber-reinforced PET was UV treated while immersed in water containing the silane and in other experiments the glass fiber-reinforced PET was UV treated and then immersed in the water containing the silane.

Table 24 shows the PATTI test results for glass fiber-reinforced PET after treating with ultraviolet light and ozone for various time periods. The Table shows that the pull-off tensile strength of the glass fiber-reinforced PET was increased when the glass fiber-reinforced PET was exposed to the ultraviolet light and ozone.

TABLE 24

PATTI test results for UV/ozone treated glass fiber-reinforced PET

| Treatment Time (secs) | Ave. Pull Off Tensile Strength (psi) | Standard Deviation |
|---|---|---|
| 0 | 156.5 | 64.3 |
| 30 | 421 | 79.2 |
| 60 | 411 | 21.2 |
| 90 | 482 | 7.07 |
| 120 | 528.5 | 29.0 |

Table 25 shows the PATTI test results for glass fiber-reinforced PET treated with UV light and ozone for various time periods and then immersed in silane with ultraviolet light and ozone. The Table shows that the pull-off tensile strength of the glass fiber-reinforced PET was increased when the glass fiber-reinforced PET was immersed in the silane solution after the exposure to the ultraviolet light and ozone.

TABLE 25

PATTI test results for UV/ozone treated glass fiber-reinforced PET immersed in silane

| Treatment Time (secs) | Ave. Pull Off Tensile Strength (psi) | Standard Deviation |
|---|---|---|
| 0 | 156.5 | 64.3 |
| 30 | 640.5 | 43.1 |
| 60 | 736.5 | 36.1 |
| 90 | 731.5 | 29.0 |
| 120 | 742 | 158.4 |

Figure 26:
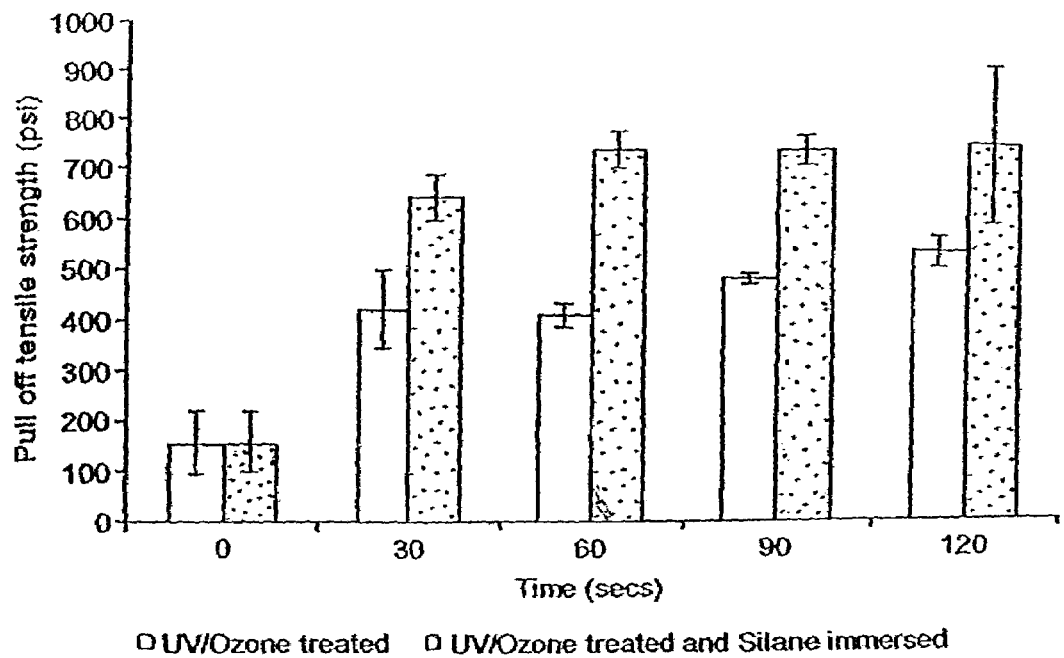
FIG. 26 is a graph comparing the PATTI results of UV/ozone treated Ticona to UV/ozone treated Ticona immersed in silane.

Comparing Table 25 to table 24, it is clear that immersing the glass fiber-reinforced PET in the silane solution caused a further increase in the pull-off tensile strength. This is shown in FIG. 26 which graphically compares the PATTI test results of glass fiber-reinforced PET after treating with ultraviolet light and ozone for various time periods (Table 24) to the PATTI test results for glass fiber-reinforced PET treated with ultraviolet light and ozone for the same time periods and then immersed in silane (Table 25) The FIG. shows that for every ultraviolet light/ozone exposure time, the pull-off tensile strength of the glass fiber-reinforced PET was further increased by subsequently immersing the glass fiber-reinforced PET in the silane solution.

Table 26 shows the PATTI test results for glass fiber-reinforced PET after treating the glass fiber-reinforced PET with ultraviolet light for various time periods wherein the glass fiber-reinforced PET was immersed in the silane and water solution during the ultraviolet light treatment (UV treated glass fiber-reinforced PET through silane).

TABLE 26

PATTI test results for UV treated glass fiber-reinforced PET through silane

| Treatment Time (secs) | Ave. Pull Off Tensile Strength (psi) | Standard Deviation |
|---|---|---|
| 0 | 156.5 | 64.3 |
| Untreated but silane immersed 5 min. | 197 | 93.3 |
| 30 | 421 | 93.3 |
| 60 | 436.5 | 71.4 |
| 90 | 452 | 7.1 |
| 120 | 533 | 7.1 |
| 180 | 640 | 72.11 |
| 240 | 742 | 43.81 |

The Table shows that the pull-off tensile strength of the treated glass fiber-reinforced PET became increasingly greater as the ultraviolet light exposure time was increased.

Figure 27:
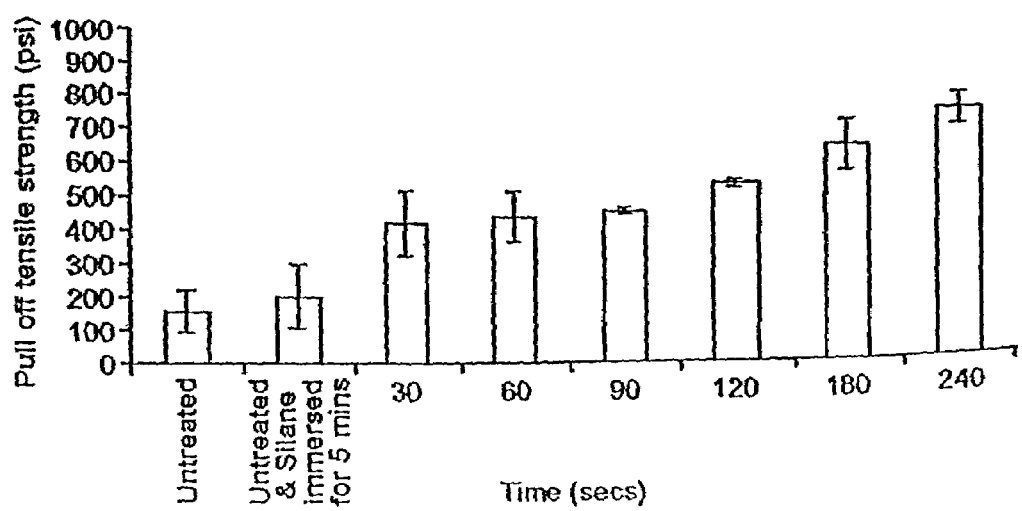
FIG. 27 is a graph showing the PATTI results for UV treated Ticona through silane.

FIG. 27 graphically shows the PATTI test results for glass fiber-reinforced PET after treating the glass fiber-reinforced PET with ultraviolet light for various time periods wherein the glass fiber-reinforced PET was immersed in the silane and water solution during the ultraviolet light treatment. The FIG. shows that the pulloff tensile strength of the treated glass fiber reinforced PET became increasingly greater as the ultraviolet light exposure time was increased.

Table 27 shows the X-ray photoelectron spectroscopy analysis (XPS) results for glass fiber-reinforced PET treated for various time periods with ultraviolet light and then immersed in the silane and water solution and glass fiber-reinforced PET treated with ultraviolet light for 240 seconds while immersed in the silane. The surface concentration is presented as atomic percent.

TABLE 27

XPS results for UV treated glass fiber-reinforced PET

|  | Control | 60 sec UV treated and silane immersed | 90 sec UV treated and silane immersed | 240 sec UV treated through silane |
|---|---|---|---|---|
| C | 71.2 | 61.8 | 71.2 | 73.4 |
| O | 18.7 | 21.7 | 17.8 | 16.5 |
| Si | 10.2 | 12.6 | 8.3 | 4.9 |
| N | 0.0 | 3.8 | 2.7 | 5.1 |

Table 27 shows that the UV treated glass fiber-reinforced PET followed by immersion in the silane solution had an increase in nitrogen bound to the surface over the untreated control. The increase in nitrogen bound to the surface was particularly significant for the glass fiber-reinforced PET UV treated through the silane solution.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A method for modifying a surface of a polymer or polymer composite substrate, the improvement which comprises:

(a) providing a surface of a polymer or polymer composite substrate;
(b) providing a lamp for generating optical energy;
(c) providing a layer of water between the surface of the substrate and the lamp;
(d) providing an aqueous silane solution on the polymer or polymer composite substrate surface to be modified comprising at least one silane of the formula $Si(OR')_{4-n}(R'')_n$ where n is 1, 2, or 3, R' is an alkyl group of 1 to 8 carbon atoms, and R" is an organic moiety comprising a member selected from the group consisting of a metal, vinyl, cyano, amino, mercapto, halogen, aldehyde, ketone, and acid, the silane being dissolved in water, wherein a silyl group of the silane reacts with hydroxyl groups on the polymer or polymer composite surface in the presence of the optical energy; and
(e) irradiating the surface with the optical energy at wavelengths between about 185 nanometers and 254 nanometers which is provided to the surface by irradiating through the layer of water to filter out any longer wavelengths in an infrared region so that the substrate does not overheat, such that the intensity of the optical energy reaching the surface is sufficient to modify the surface while the surface is exposed to the silane, so that the silyl group with the organic moiety is covalently bonded to the surface.

2. The method of claim 1 wherein the surface is irradiated with the optical energy which is generated by a xenon flashlamp energized by current pulses.

3. The method of claim 1 or 2 wherein the irradiating the surface is in a predetermined pattern with the optical energy.

4. The method of claim 1 or 2 wherein the surface comprises a glass fiber-reinforced PET.

5. The method of claim 1 or 2 wherein the surface is treated with ozone prior to irradiating the surface.

6. The method of claim 1 or 2 wherein the silane is an amino silane which forms an amino silyl group on the surface.

7. The method of claim 1 wherein the layer of water is provided as liquid on a transparent tray between the surface and the lamp to filter out the longer wavelengths.

8. A method for modifying a surface of a polymer or polymer composite substrate, the improvement which comprises:

(a) providing a surface of a polymer or polymer composite substrate;
(b) providing a lamp for generating optical energy;
(c) providing a layer of water between the surface of the substrate and the lamp;
(d) irradiating the polymer or polymer composite surface through the layer of water with optical energy from the lamp at wavelengths between about 185 nanometers and 254 nanometers which is provided to the surface by irradiating through the layer of water to filter out any longer wavelengths in an infrared region so that the substrate does not overheat, while the surface is exposed to ozone dissolved in water on the surface, at an intensity sufficient to render the surface reactive with at least one silane of the formula $Si(OR')_{4-n}(R'')_n$ where n is 1, 2, or 3, R' is an alkyl group of 1 to 8 carbon atoms, and R" is an organic moiety and comprises a member selected from the group consisting of a metal, vinyl, cyano, amino, mercapto, halogen, aldehyde, ketone, and acid; and
(e) providing on the irradiated surface the silane dissolved in water which reacts with hydroxyl groups on the irradiated polymer or polymer composite surface to covalently bond a silyl group with the organic moiety to the surface.

9. The method of claim 8 wherein the surface is irradiated with the optical energy which is generated by a xenon flashlamp energized by current pulses.

10. The method of claim 8 or 9 wherein the irradiating the surface is in a predetermined pattern with the optical energy.

11. The method of claim 8 or 9 wherein the surface comprises a glass fiber-reinforced PET.

12. The method of claim 8 or 9 wherein the silane is an amino silane which forms an amino silyl group on the surface.

13. The method of claim 8 wherein the layer of water is provided as a liquid on a transparent tray between the surface and the lamp to filter out the longer wavelengths.

14. The method of claim 7 or 13 wherein the transparent tray is quartz or fused silica.

15. The method of claim 7 or 13 further comprising cooling the surface of the polymer or polymer composite substrate during the irradiation with a cooling plate upon which the substrate is mounted.

* * * * *

UNITED STATES PATENT AND TRADEMARK OFFICE
CERTIFICATE OF CORRECTION

PATENT NO.       : 7,094,451 B2
APPLICATION NO.  : 10/289986
DATED            : August 22, 2006
INVENTOR(S)      : Lawrence T. Drzal and Praveen Tummala It is certified that error appears in the above-identified patent and that said Letters Patent is hereby corrected as shown below:

Column 4, line 32, "using UV excimer lasers" should be --using UV exciter lasers--.

Figure 18:
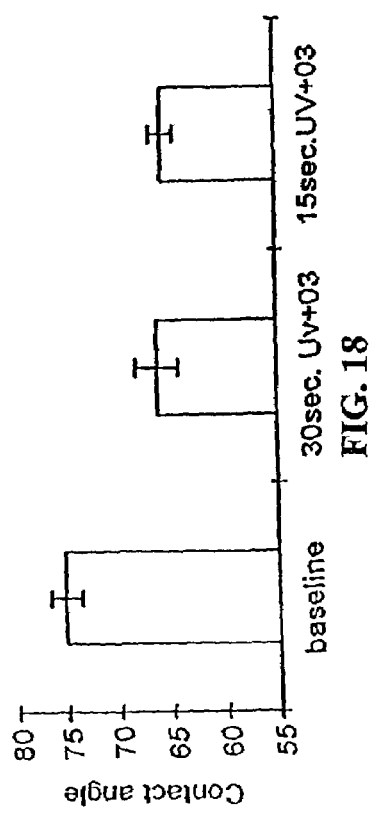
FIG. 18 are graphs showing the effect of UV treatment on wettability (cos θ) and adhesive bond strength of polypropylene (without UV stabilizers).
Figure 19:
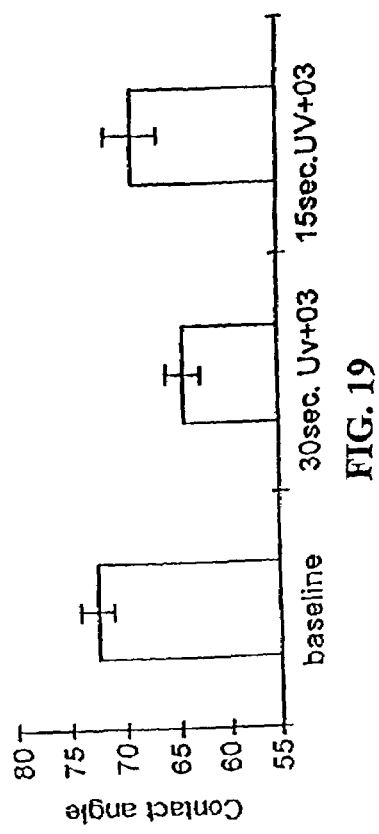

Column 5, line 65, "Fig. 18" should be --FIG. 17--.

Column 6, lines 1 to 15, Lines 1 through 15 should be deleted.

Column 30, line 29, "Mg K$a\alpha_{1,2}$" should be --Mg K$\alpha_{1,2}$--.

Signed and Sealed this

Third Day of July, 2007

JON W. DUDAS
*Director of the United States Patent and Trademark Office*